(12) United States Patent
Wynne et al.

(10) Patent No.: US 11,623,397 B2
(45) Date of Patent: *Apr. 11, 2023

(54) ADDITIVE MANUFACTURED PARTS WITH SMOOTH SURFACE FINISHES AND CUSTOMIZABLE PROPERTIES

(71) Applicant: Intrepid Automation, San Diego, CA (US)

(72) Inventors: Ben Wynne, Escondido, CA (US); Jamie Lynn Etcheson, San Diego, CA (US); Christopher Sean Tanner, Idyllwild, CA (US); Robert Lee Mueller, San Diego, CA (US); Ivan Dejesus Chousal, Chula Vista, CA (US); Madison Lee Stadtmueller, Encinitas, CA (US); James Michael Pingel, San Diego, CA (US)

(73) Assignee: Intrepid Automation, San Diego, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/249,093

(22) Filed: Feb. 19, 2021

(65) Prior Publication Data
US 2021/0170685 A1 Jun. 10, 2021

Related U.S. Application Data

(63) Continuation-in-part of application No. PCT/US2019/050223, filed on Sep. 9, 2019, which is
(Continued)

(51) Int. Cl.
*B29C 64/245* (2017.01)
*B33Y 30/00* (2015.01)
(Continued)

(52) U.S. Cl.
CPC .......... *B29C 64/245* (2017.08); *B29C 64/135* (2017.08); *B29C 64/188* (2017.08);
(Continued)

(58) Field of Classification Search
CPC ... B29C 64/386; B29C 64/393; B29C 64/241; B29C 64/188; B33Y 10/00
See application file for complete search history.

(56) References Cited

U.S. PATENT DOCUMENTS

| 4,161,065 A | 7/1979 | Gigante |
| 4,479,769 A | 10/1984 | Simioni |

(Continued)

FOREIGN PATENT DOCUMENTS

| EP | 3186303 A1 | 7/2017 |
| JP | 2000085018 A | 3/2000 |

(Continued)

OTHER PUBLICATIONS

European Search Report dated May 12, 2022 for European Patent Office Patent Application No. 19859914.4.
(Continued)

*Primary Examiner* — Larry W Thrower
(74) *Attorney, Agent, or Firm* — MLO, a professional corp.

(57) ABSTRACT

Methods of producing an additive manufactured part with a smooth surface finish and customized properties include creating a compensated design that serves as a print recipe for an additive manufacturing process for a part, where the creating comprises modifying a desired design with a geometric offset correction to compensate for a first portion of an uncured surface finish material to be retained on the part. A spinning device is provided that has a platform. The part is formed with the additive manufacturing process and secured to the platform, where the part is at least partially
(Continued)

wetted with the uncured surface finish material. The platform is rotated, where a second portion of the uncured surface finish material is removed due to forces imparted by the rotating. The uncured surface finish material is chosen to customize a property of the part.

19 Claims, 21 Drawing Sheets

Related U.S. Application Data a continuation of application No. 16/360,675, filed on Mar. 21, 2019, now Pat. No. 10,759,116.

(60) Provisional application No. 62/731,404, filed on Sep. 14, 2018.

(51) Int. Cl.
| | |
|---|---|
| *B33Y 10/00* | (2015.01) |
| *B29C 64/135* | (2017.01) |
| *B29C 64/188* | (2017.01) |
| *B33Y 40/20* | (2020.01) |
| *B29C 64/241* | (2017.01) |
| *B29C 64/379* | (2017.01) |
| *B05D 1/00* | (2006.01) |

(52) U.S. Cl.
CPC .......... *B29C 64/241* (2017.08); *B29C 64/379* (2017.08); *B33Y 10/00* (2014.12); *B33Y 30/00* (2014.12); *B33Y 40/20* (2020.01); *B05D 1/002* (2013.01)

(56) References Cited

U.S. PATENT DOCUMENTS

| | | | |
|---|---|---|---|
| 5,143,663 A | 9/1992 | Leyden et al. | |
| 5,393,215 A | 2/1995 | Donovan | |
| 5,906,836 A | 5/1999 | Panaroni et al. | |
| 6,199,419 B1 | 3/2001 | Shrayer et al. | |
| 7,452,568 B2 | 11/2008 | Hougham et al. | |
| 9,041,285 B2 | 5/2015 | Hussell et al. | |
| 9,849,495 B2 | 12/2017 | Sakane et al. | |
| 9,908,291 B2 | 3/2018 | Mech | |
| 9,931,697 B2 | 4/2018 | Levin et al. | |
| 10,759,116 B2 * | 9/2020 | Wynne | B29C 64/386 |
| 2005/0173838 A1 | 8/2005 | Priedeman et al. | |
| 2009/0321972 A1 | 12/2009 | Zinniel | |
| 2013/0287933 A1 | 10/2013 | Kaiser et al. | |
| 2015/0048553 A1 | 2/2015 | Dietrich et al. | |
| 2015/0093544 A1 | 4/2015 | Vrie et al. | |
| 2016/0107375 A1 | 4/2016 | Ohnishi et al. | |
| 2017/0129060 A1 | 5/2017 | Szuromi et al. | |
| 2017/0368740 A1 | 12/2017 | Rolland | |
| 2018/0099300 A1 | 4/2018 | Dufort et al. | |
| 2018/0141267 A1 | 5/2018 | Dudley | |
| 2018/0141270 A1 | 5/2018 | Steege | |
| 2018/0178241 A1 | 6/2018 | Luo et al. | |
| 2020/0215811 A1 * | 7/2020 | Friedrich | B33Y 30/00 |

FOREIGN PATENT DOCUMENTS

| | | |
|---|---|---|
| WO | 2014161523 A2 | 10/2014 |
| WO | 2016030490 A1 | 3/2016 |

OTHER PUBLICATIONS

International Search Report dated Dec. 27, 2019 for PCT Patent Application No. PCT/US2019/050223.
Notice of Allowance dated Jun. 16, 2020 for U.S. Appl. No. 16/360,675.
Office Action dated Mar. 17, 2020 for U.S. Appl. No. 16/360,675.
Office Action dated May 27, 2020 for U.S. Appl. No. 16/360,675.
Office Action dated Aug. 17, 2022 for China Patent Application No. 201980067831.1.

* cited by examiner

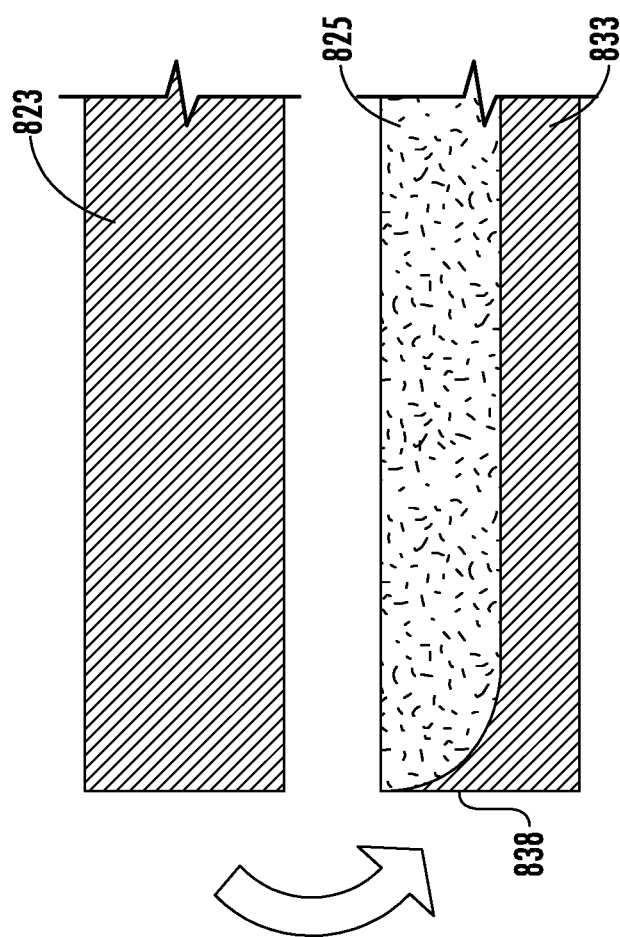
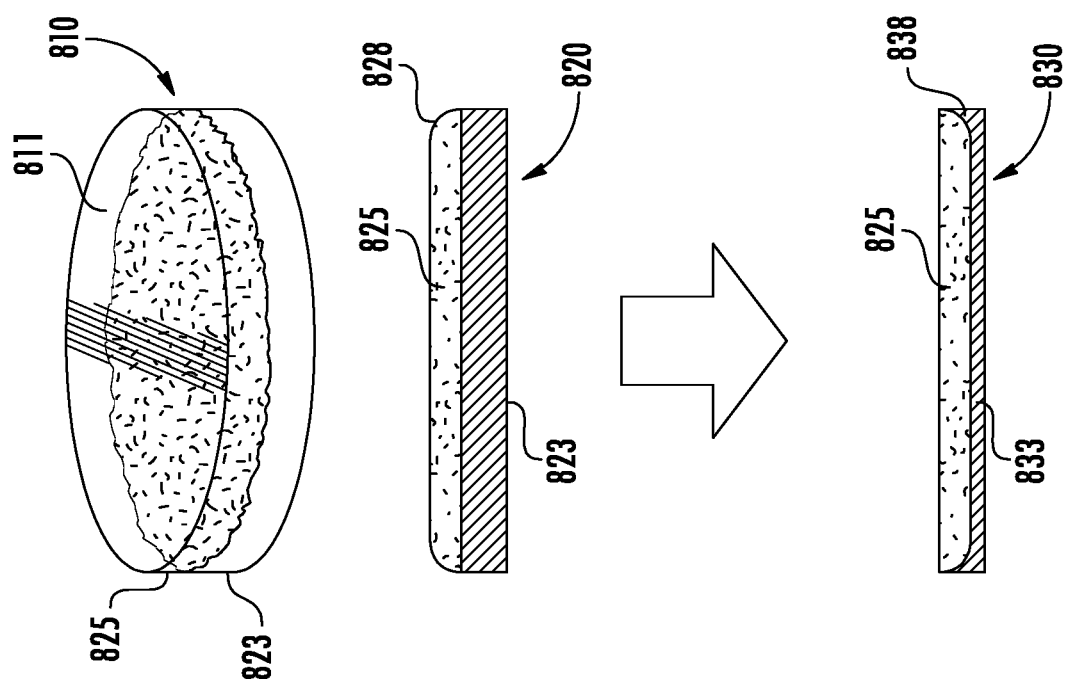
FIG. 8B
FIG. 8A

ADDITIVE MANUFACTURED PARTS WITH SMOOTH SURFACE FINISHES AND CUSTOMIZABLE PROPERTIES

RELATED APPLICATIONS

This application is a continuation-in-part of International Patent Application No. PCT/US2019/050223, filed on Sep. 9, 2019 and entitled "Additive Manufactured Parts with Smooth Surface Finishes"; which claims priority to U.S. Non-Provisional patent application Ser. No. 16/360,675, filed on Mar. 21, 2019 and entitled "Additive Manufactured Parts with Smooth Surface Finishes"; which claims priority to U.S. Provisional Patent Application No. 62/731,404, filed on Sep. 14, 2018 and entitled "Additive Manufacturing Parts with Smooth Surface Finishes"; which are all hereby incorporated by reference in their entirety.

BACKGROUND

There are many types of additive manufacturing (i.e., 3D printing) systems and methods. One method utilizes photosensitive polymers (i.e., photopolymers) that cross-link and harden from a liquid resin to a solid polymeric material upon exposure to light. These photoreactive 3D printing systems typically include a resin pool, an illumination system, and a print platform, where the illumination system projects an image (i.e., pattern) into the resin pool causing a layer of a polymeric object to be formed on the print platform. The print platform then moves the printed layer out of the focal plane of the illumination system, and then the next layer is exposed (i.e., printed). Other types of 3D additive manufacturing methods include stereolithography, selective laser sinter, and fused deposition modeling.

Regardless of the type of additive manufacturing process used, the printed part typically undergoes post-processing steps to clean excess material (e.g., uncured polymer) from the part and to smooth any stepped layers of material that are created during the printing. Existing methods for smoothing surfaces of 3D printed parts include sanding, polishing, machining, vapor smoothing, applying a coating (e.g., paint, epoxy), and acetone cold welding. In some cases, the post-processing steps themselves—such as isopropyl alcohol (IPA) cleaning baths, ultrasonic baths and curing—can cause roughness on the part by causing pitting and porosity on the cured, printed surfaces. These rough surface finishes can be highly undesirable, such as for 3D printed parts that are used as patterns for investment casting to produce metal parts. There continues to be a need to produce 3D-printed parts with high-quality finishes in efficient, cost-effective ways.

SUMMARY

In some embodiments, methods of producing an additive manufactured part with a smooth surface finish include creating a compensated design that serves as a print recipe for an additive manufacturing process for a part. The creating comprises modifying a desired design with a geometric offset correction to compensate for a first portion of an uncured first surface finish material to be retained on the part and for a first portion of an uncured second surface finish material to be retained on the part. The part is formed with the additive manufacturing process according to the compensated design, where the uncured first surface finish material is a resin used to form the part. An uncured second surface finish material is applied to the part, where the uncured second surface finish material is a material that is different from the resin. A spinning device is provided, the spinning device having a platform that rotates about an axis. The part is secured to the platform, where the part is at least partially wetted with the uncured second surface finish material. The platform is rotated, where the first portion of the uncured second surface finish material is retained on the part and a second portion of the uncured second surface finish material is removed due to forces imparted by the rotating. The part is cured after the rotating.

In some embodiments, methods of producing an additive manufactured part with a smooth surface finish include creating a compensated design that serves as a print recipe for an additive manufacturing process for a part. The creating includes modifying a desired design with a geometric offset correction to compensate for a first portion of an uncured surface finish material to be retained on the part. The part is formed from a resin with the additive manufacturing process according to the compensated design. A spinning device is provided, the spinning device having a platform that rotates about an axis. The part is secured to the platform, where the part is at least partially wetted with the uncured surface finish material. The platform is rotated, where the first portion of the uncured surface finish material is retained on the part and a second portion of the uncured surface finish material is removed due to forces imparted by the rotating. The part is cured after the rotating. The uncured surface finish material is chosen to customize a mechanical property of the part formed by the resin after the curing.

BRIEF DESCRIPTION OF THE DRAWINGS

FIGS. 8A-8B show schematics of compensating for edge sharpness, in accordance with some embodiments.

DETAILED DESCRIPTION

Figure 1A:
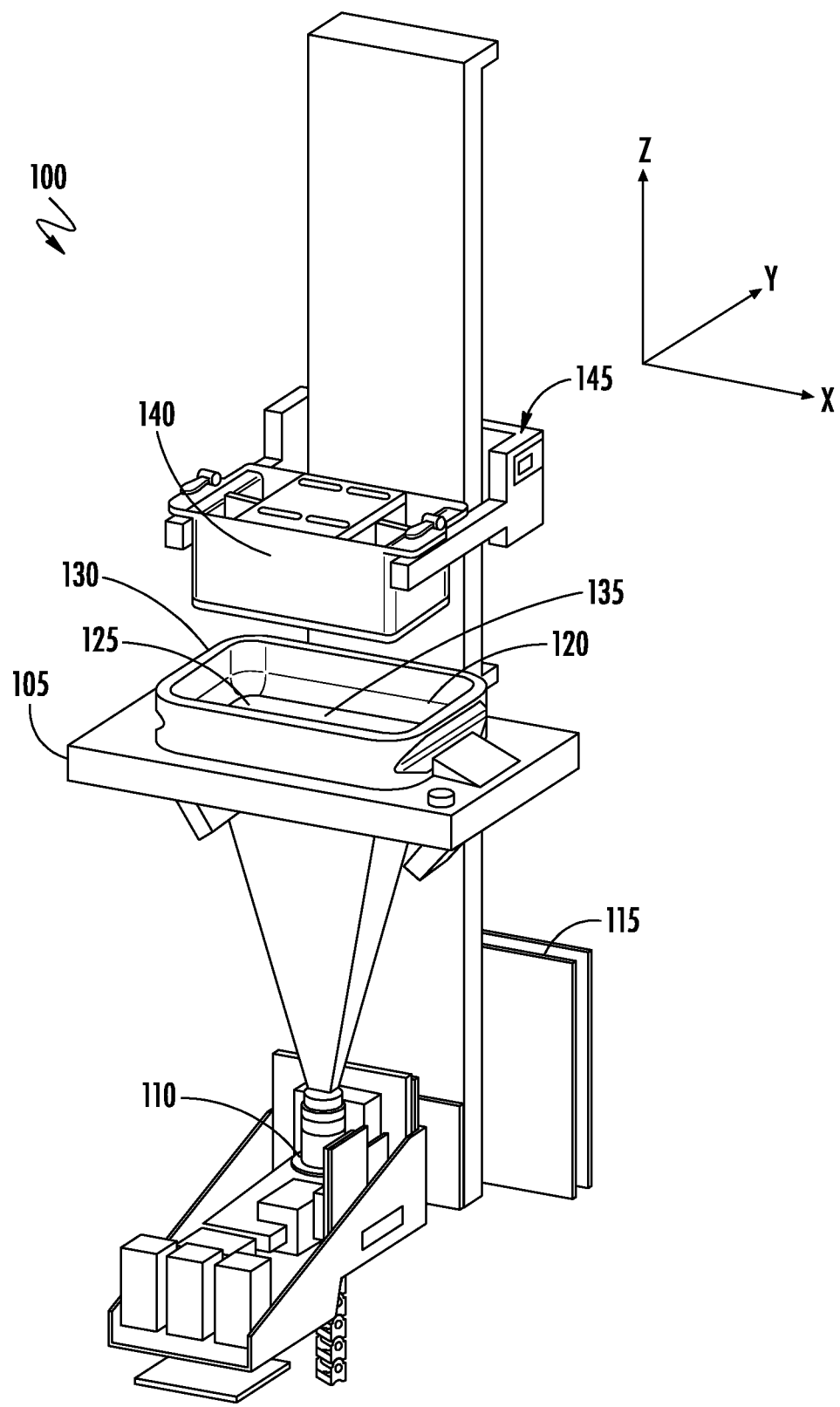
FIGS. 1A-1B are simplified perspective views of a photoreactive 3D printing systems (PRPS), in accordance with some embodiments.

The present embodiments provide methods and systems for producing parts with additive manufacturing such that the parts have smooth surface finishes, while reducing time spent on conventional post-processing steps such as machining and polishing. Some embodiments may be particularly useful for, but are not limited to, parts that are used as patterns in investment casting, such as in applications that require extremely high-quality surface finishes (e.g., medical implants). By producing patterns that have a desired surface quality, the parts casted from the patterns will also reduce or even eliminate post-processing machining and polishing time of the casted parts. More generally, the present embodiments are applicable to any parts that require high-quality surface finishes, including parts manufactured by methods other than additive manufacturing such as injection molding or casting. For example, a part may be made by CNC subtractive manufacturing, and then a surface finish material may be applied onto the part and the part rotated on a spinning device to improve the smoothness of the surface of the part. Spinning of a machined part (e.g., fabricated by CNC) can also be performed before application of a surface finish material in order remove chips and debris that remain from the subtractive manufacturing.

In some embodiments, a part is wetted with an uncured surface finish material after the part is 3D-printed, where the uncured surface finish material can be residual from the printing process or can be applied in a separate step after the printing. A force is applied to the surface finish material to remove excess surface finish material while retaining a portion of the surface finish material on the part. In some embodiments, the force is applied by rotating the part on a spinning machine such that excess surface finish material is expelled from the part while the portion of the surface finish material that remains on the part fills in rough areas and creates a smooth finish. In some embodiments, the surface finish material that is removed from the part can be collected for reuse. In some embodiments, the methods include modifying the design used for printing the part, such as by adjusting dimensions and geometric features to compensate for the surface finish material that will be applied to and retained on the part. Thus, the present embodiments not only produce parts with high-quality, extremely smooth surface finish, but also with accurate dimensions and geometries.

Some embodiments also include applying a layer onto the printed part that provides customizable properties in addition to a smooth surface finish, such as improved mechanical properties of the composite part (printed material with the additional layer) compared to mechanical properties of the original (primary) additively manufactured part without the additional layer. That is, the one or more coating layers achieve customizable properties that are enhanced compared to the primary printed part, while also achieving a high-quality surface finish. Examples of mechanical properties that can be tailored by the coating layers include but are not limited to tensile modulus, ultimate tensile strain, ultimate tensile stress and flexural modulus. Mechanical properties can also be tailored to impact time-dependent mechanical characteristics such as stress relaxation (change in stress under constant strain) or creep (change in strain under constant stress). For example, tensile modulus, ultimate tensile strain, ultimate tensile stress can be customized by the combination of materials of the primary additively manufactured part and any surface finish layers to impact stress relaxation. Other types of properties that may be customized by the use of surface finish materials include, for example, thermal properties (e.g., thermal insulation or thermally conductivity) and/or electrical properties (e.g., providing electrical conductivity in the surface finish material layer).

Embodiments for providing these enhanced properties shall primarily be described in this disclosure for the fabrication of direct printed dental aligner parts but are applicable to any additively manufactured pieces that benefit from not only high-quality surface finishes but also customized properties. Examples of other applications include but are not limited to sleep apnea night guards, electrical connectors, automotive components, handles, footwear, medical splints, dental splints and prosthetics. In embodiments for customizing properties, the printed parts are spun and then coated with a second material, then spun again and finally cured. In such embodiments, the interface between the original printed material and the second material (i.e., coating or surface finish material) forms crosslinked bonds that reap the benefits of mechanical properties of both individual materials in a manner that is better than the sum of its parts. In some embodiments, the material properties of the coating itself can enhance a property of the final part (e.g., by having a higher tensile stress than the material of the original 3D-printed part) and/or provide a new property (e.g., modifying thermal or electrical conductivity or insulation, such as modifying insulation breakdown voltage to enable the part to withstand high voltages). These enhancements by the addition of a surface finish material results in enhanced properties that cater to the specific use case (e.g., dental aligners) such as by achieving a desired tensile modulus, strain and/or stress when enhancing mechanical properties.

In some embodiments, methods of producing an additive manufactured part with a smooth surface finish and improved mechanical properties include providing a part that has been formed by an additive manufacturing process. The additive manufacturing process comprises photopolymerization of a resin in a resin pool. A spinning device is provided, with a platform that rotates about an axis. The part is secured to the platform, where the part is at least partially wetted with uncured resin from the resin pool. The platform is rotated, where a first portion of the uncured resin is retained on the part and a second portion of the uncured resin is removed. The part is then coated or dipped with the same or other material or combination thereof and rotated again. The part is cured after the final rotation.

In this disclosure, the terms "additive manufacturing" and "3D printing" shall be used interchangeably. Also, although many embodiments will be described using photopolymerization of resin as an example additive manufacturing process, the embodiments apply to other types of additive manufacturing process as well. Furthermore, the present embodiments may be applied to non-3D printing methods. Similarly, references to "resin" may be interchanged with other surface finish materials, as shall be described throughout this disclosure. In this disclosure, a "smooth surface finish" is a finish that is smoother than a starting state, such as a reduction in roughness resulting in up to a glaze-like or mirror finish. For example, the 3D printed parts can have a final smoothness that produces investment casted metal parts with a roughness Ra in a range such as, but not limited to, 0.025 μin to 1000 μin. The terms "laminate" and "composite" structure shall be used for the completed part that includes the original additive manufactured part and any surface finish material coating layers that have been applied to the part. Surface finish materials that are applied into the printed part may also be referred to as coatings or layers or additional layers and may be the same or different material than the resin material that is used to additively manufacture the part.

Figure 1B:
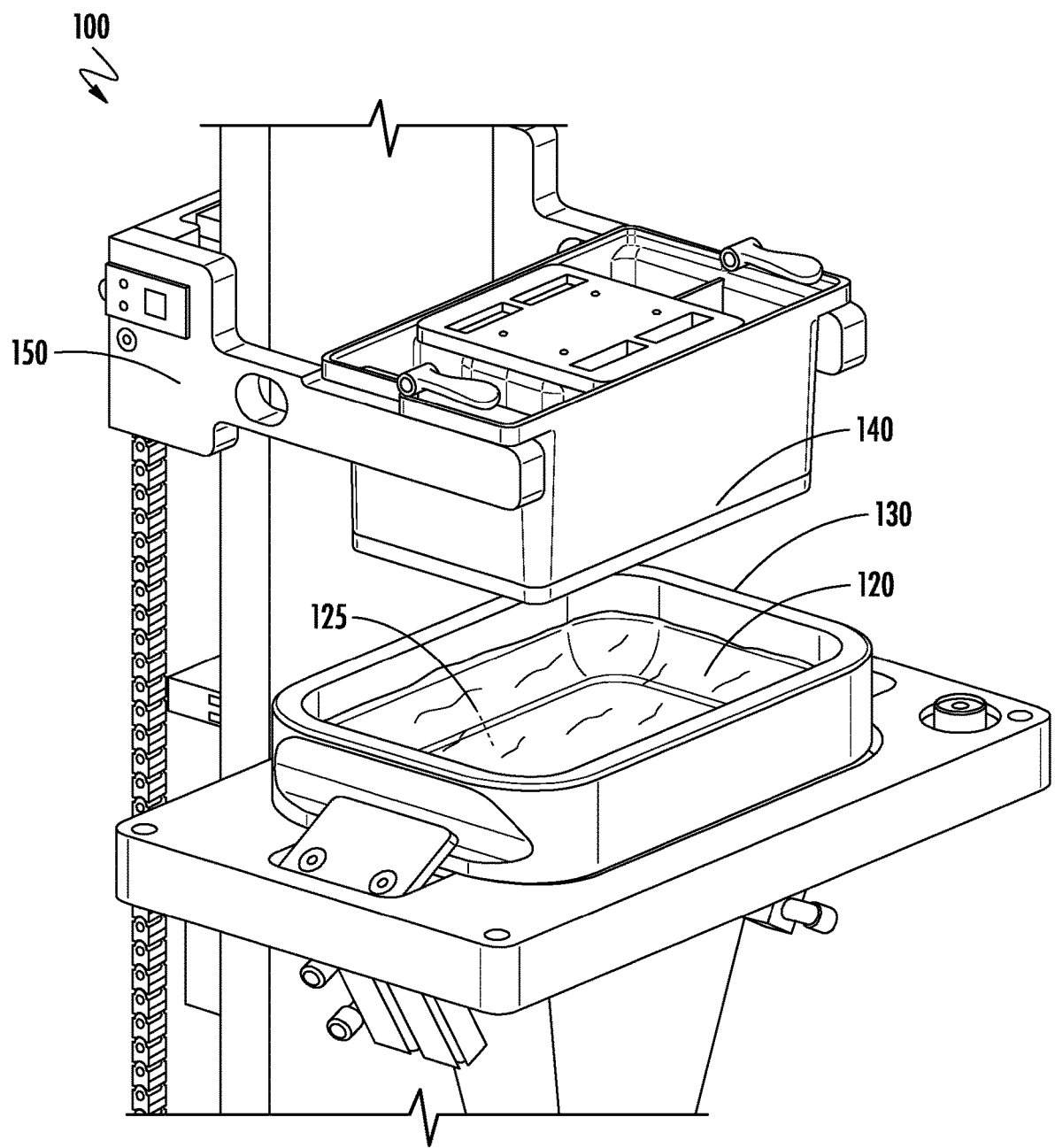

FIGS. 1A-1B illustrate an example of a photoreactive printing system 100 (PRPS), in accordance with some embodiments. The PRPS 100 shown in FIGS. 1A-1B contains a chassis 105, an illumination system 110, an image display system 115, a resin pool 120, a polymer interface 125, a resin tub 130, a membrane 135, a print platform 140, an elevator system 145, and elevator arms 150.

The chassis 105 is a frame to which some of the PRPS components (e.g., the elevator system 145) are attached. In some embodiments, one or more portions of the chassis 105 are oriented vertically, which defines a vertical direction (i.e., a z-direction) along which some of the PRPS components (e.g., the elevator system 145) move. The print platform 140 is connected to the elevator arms 150 (FIG. 1B), which are movably connected to the elevator system 145. The elevator system 145 enables the print platform 140 to move in the z-direction. The print platform 140 can thereby be lowered into the resin pool 120 to support the printed part and lift it out of the resin pool 120 during printing.

The illumination system 110 projects a pattern through the membrane 135 into the resin pool 120 that is confined within the resin tub 130. A build area is an area in the resin pool 120 where the resin is exposed (e.g., to ultraviolet light from the illumination system) and crosslinks to form a first solid polymer layer on the print platform 140. Some non-limiting examples of resin materials include acrylates, epoxies, methacrylates, urethanes, silicones, vinyls, combinations thereof, or other photoreactive resins that crosslink upon exposure to illumination. In some embodiments, the resin has a relatively short curing time compared to photosensitive resins with average curing times. In some embodiments, the resin is photosensitive to wavelengths of illumination from about 200 nm to about 500 nm, or to wavelengths outside of that range (e.g., greater than 500 nm, or from 500 nm to 1000 nm). In some embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 140 moves upwards (i.e., in the positive z-direction as shown in FIG. 1A), and a second layer can be formed by exposing a second pattern projected from the illumination system 110. This "bottom up" process can then be repeated until the entire object is printed, and the finished object is then lifted out of the resin pool 120.

In some embodiments, the illumination system 110 emits radiant energy (i.e., illumination) over a range of different wavelengths, for example, from 200 nm to 500 nm, or from 500 nm to 1000 nm, or over other wavelength ranges. The illumination system 110 can use any illumination source that is capable of projecting a pattern for printing the 3D part. Some non-limiting examples of illumination sources are arrays of light emitting diodes, liquid crystal-based projection systems, liquid crystal displays (LCDs), liquid crystal on silicon (LCOS) displays, mercury vapor lamp-based projection systems, digital light processing (DLP) projectors, discrete lasers, and laser projection systems.

The example system (PRPS 100) shown in FIGS. 1A-1B is a non-limiting example of an additive manufacturing system. Other PRPSs can be inverted with respect to the system shown in FIGS. 1A-1B. In such "top down" systems, the illumination source is above the resin pool, the print area is at the upper surface of the resin pool, and the print platform moves down within the resin pool between each printed layer. Furthermore, the present methods and systems can be used with parts printed by other additive manufacturing processes including resin-based or powder-based processes. Examples of resin-based additive manufacturing processes include, but are not limited to, stereolithography (SLA) and continuous liquid interface printing (CLIP™). Examples of powder-based additive manufacturing processes include, but are not limited to, selective laser sintering (SLS), Multi Jet Fusion™ and direct metal laser sintering.

Creating a Smooth Surface Finish

The present embodiments uniquely apply a force to an uncured surface finish material that is on a part to create a final, smooth surface by filling in defects such as rough areas, pits, pores and cracks. For example, in the photopolymerization system 100 of FIGS. 1A-1B, the 3D-printed part that emerges from the resin pool 120 will have uncured resin remaining on its surface and possibly inside it, depending on the geometry of the part. In some embodiments, this uncured resin serves as the surface finish material, where force is applied by rotating the part with a spinning device. The rotating is configured such that the resulting centrifugal forces cause some of the resin to be expelled from the part, while some of the resin will remain on the part, such as due to surface tension or by being trapped in a geometrical feature of the part. The spinning can also beneficially allow for reclamation of excess resin, where the reclamation reduces waste and maximizes overall production efficiency. Furthermore, collecting the excess resin by spinning potentially enables the elimination of hazardous IPA that is conventionally used for cleaning 3-D printed parts, thereby reducing costs associated with hazardous disposal, safety, and/or fire mitigation efforts in the production line.

Figure 2:
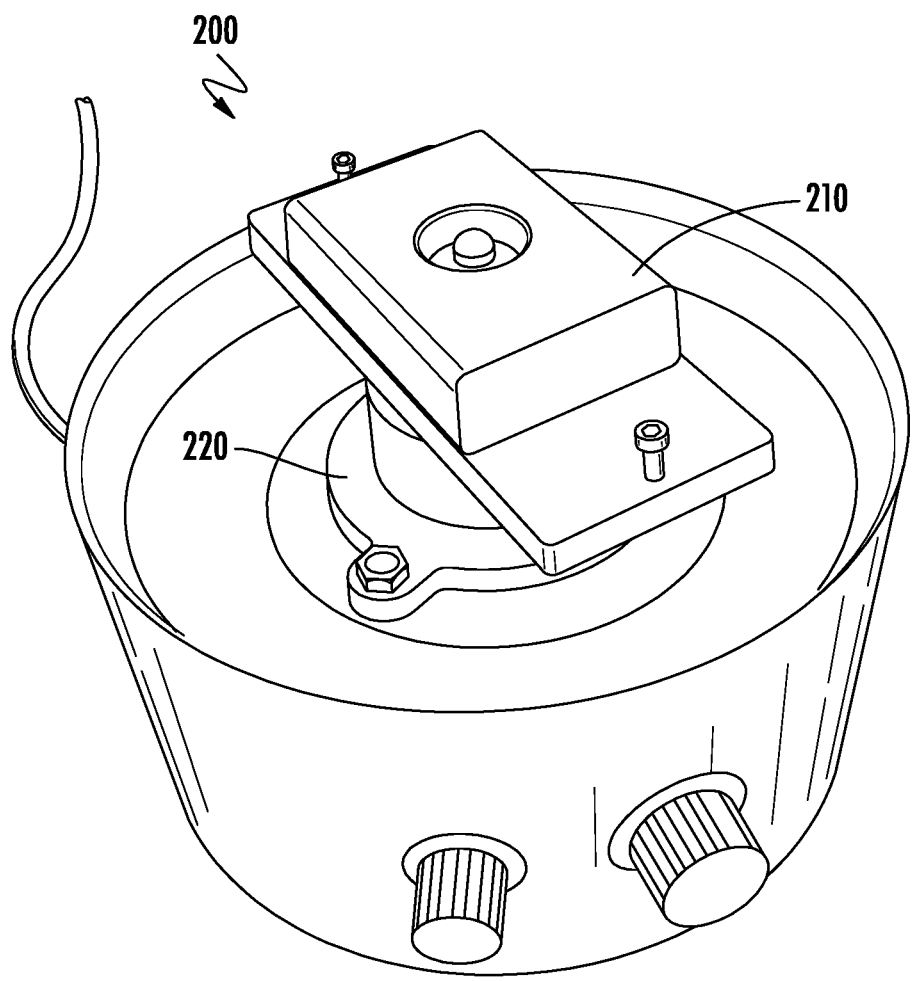
FIG. 2 is a perspective view of a spinning device, in accordance with some embodiments.

FIG. 2 is a perspective view of an embodiment of a spinning device 200 that may be used in the present methods. The spinning device 200 has a platform 210 that rotates about an axis and to which the 3D printed part, wetted with uncured resin or other surface finish material, will be secured. The spinning device 200 (which may also be referred to in this disclosure as a centrifugal machine) includes a motorized or pneumatic rotation mechanism 220 that rotates the platform. The platform is coupled to a rotation shaft of the rotation mechanism either directly or via a gearbox and/or transmission. The shaft serves as the rotation axis of the spinning device 200.

Figure 3:
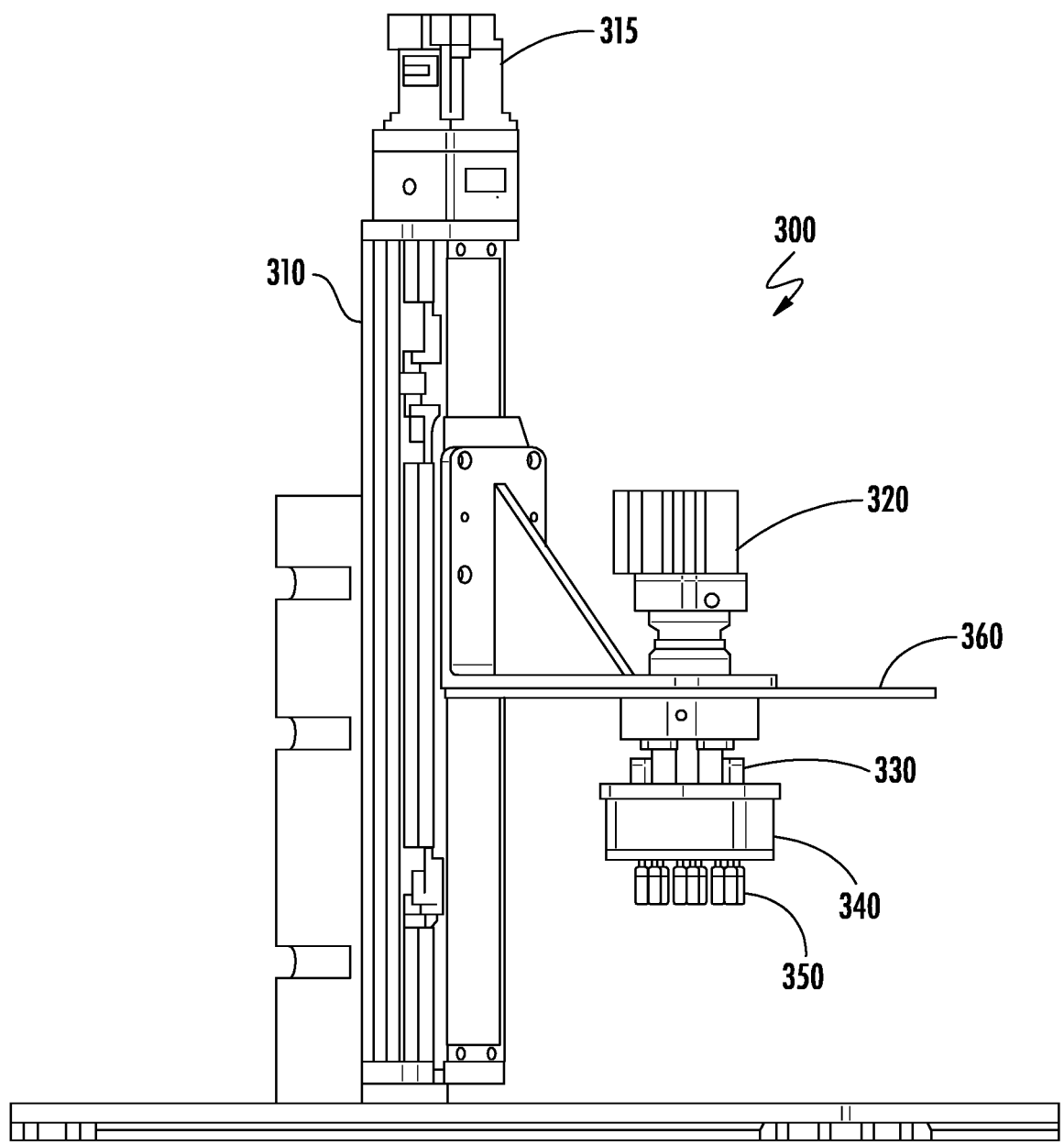
FIG. 3 is a perspective view of a spinning device, in accordance with some embodiments.

FIG. 3 shows an alternative embodiment of a spinning device 300, where the spinning device 300 is mounted on a stand 310 with an elevator motor 315 that can be used to raise or lower the printed part being processed. The configuration of FIG. 3 may be used, for example, on a manufacturing line where a part will be transferred from a printing station to a spinning station. Spinning device 300 includes a spin motor 320 and a platform 330 coupled to the spin motor 320. FIG. 3 also shows 3D printed parts 350 attached to a build tray 340 that is mounted to the platform 330. The spinning device 300 is shown upside down compared to FIG. 2 such that the printed parts 350 are suspended downward from the build tray 340. The spinning device 300 may also include a resin splash guard 360 to keep the spin motor 320 clean from excess resin that is being removed from the parts 350. The splash guard 360 may be made of, for example a plastic material and can also include ultraviolet (UV) blocking properties to prevent the uncured resin from curing during the spinning.

In some embodiments, the 3D-printed part is directly mounted to the platform 210 (or platform 330). For example, the part can be removed from a build platform of the 3D printer and then can be directly attached to the platform such as by mechanical fasteners (e.g., screws, clamping mechanisms, hooks that engage with the part geometry), or by adhesives. In other embodiments, as illustrated by FIG. 2, the platform 210 of spinning device 200 is designed with one or more mounting features capable of mounting a build tray that holds a freshly printed 3D additive manufactured part. For example, in FIG. 2 the platform 210 has mounting feature which is a raised block onto which a matching recess in a build tray can be fitted.

Figure 4A:
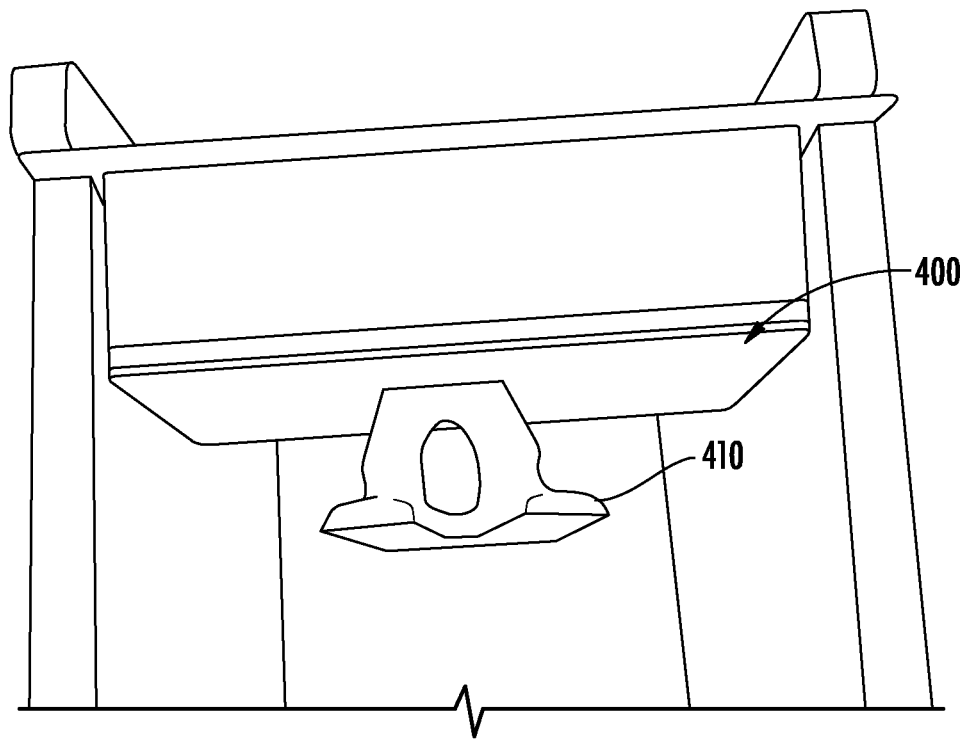
FIGS. 4A-4B are side views of a 3D-printed part on a build tray, in accordance with some embodiments.
Figure 4B:
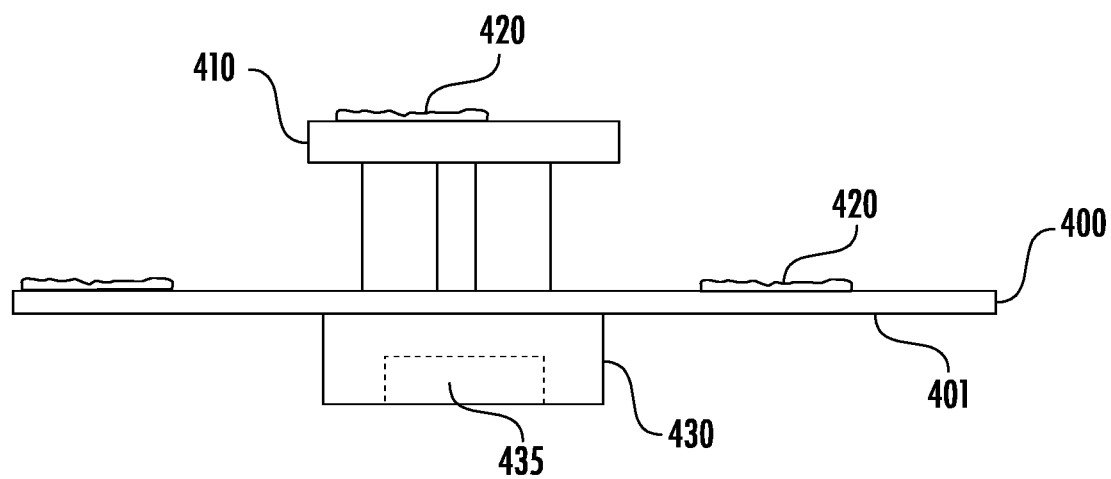

FIGS. 4A and 4B illustrate a printer build tray 400 onto which a 3D-printed part 410 is attached as a result of the 3D-printing process. In the side view of FIG. 4A, the build tray 400 has emerged from the resin pool and is still in the 3D printer, and in the inverted side view of FIG. 4B the build tray 400 has been removed from the 3D printer. In FIG. 4B, uncured resin 420 remains on the part 410 after being removed from the printer. The back side 401 of the build tray 400—that is, the opposite surface from the surface on which the part was printed—is configured with a mounting feature 435 to couple the tray 400 to a spinning device. In this embodiment, the mounting feature 435 is a recess in block 430, where the mounting feature 435 is designed to fit onto the raised block of platform 210 in FIG. 2, for instance. Mounting features that may be used in the present embodiments include, for example, grooves, pins, recessed areas shaped to mate with the platform mounting features, and mechanical fasteners such as brackets, clamps and screws.

In some embodiments, the platform can be configured to hold single or multiple build trays. In some embodiments, the parts can be positioned and arranged on the platform with respect to the rotation axis to enable excess resin to be removed from the part due to the centrifugal forces during the rotating, and also to balance the load carried by the platform. For example, as shall be described in more detail later, the part may be mounted onto the platform such that a central axis of the part is aligned with the rotation axis of the platform to achieve an axisymmetric distribution of the resin, or the part may be offset from the rotation axis of the platform to achieve directional distribution of the resin. The placement of parts may depend on the geometries of the specific parts, such as by orienting parts with respect to the direction of the centrifugal force to enable resin to be released from surfaces and/or escape from cavities.

Once the part is secured and mounted, the spinning device (e.g., device 200 of FIG. 2) is turned on to centrifugally force excess resin off of the printed parts while retaining some of the resin on the part. Once the parts have been spun, a smooth (e.g., clean, "glaze-like," and/or uniform) finish appears on the part's surface due to the portion of the uncured resin that remains on the part. The spinning action also cleans off uncured resin from the parts without the use of IPA, and the excess resin can be captured and reclaimed. The parts are then sent to a curing station where they are cured to harden the thin glaze finish created by the resin that was retained on the part.

Figure 5A:
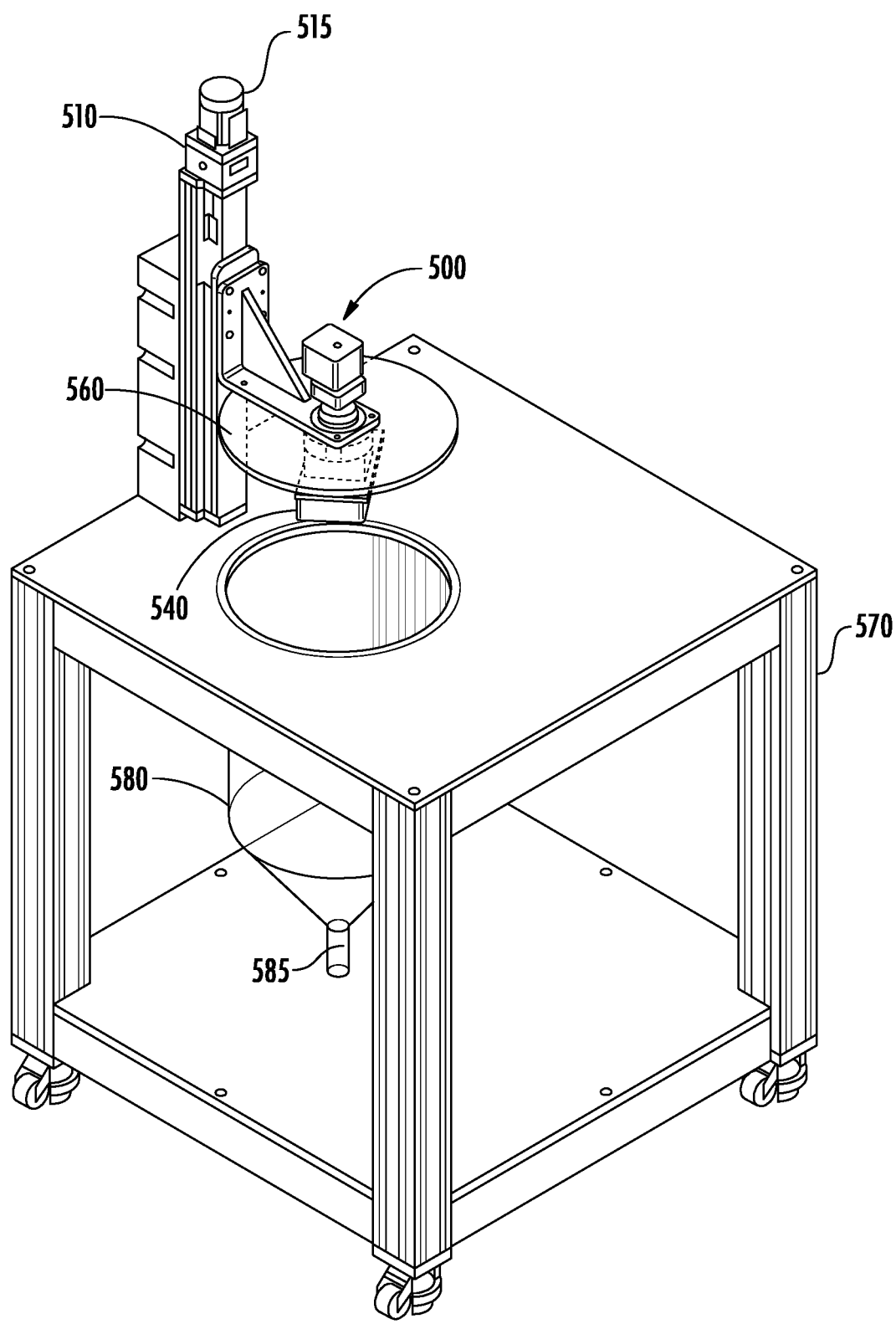
FIGS. 5A-5B are perspective views of spinning devices having chambers for collecting surface finish material, in accordance with some embodiments.
Figure 5B:
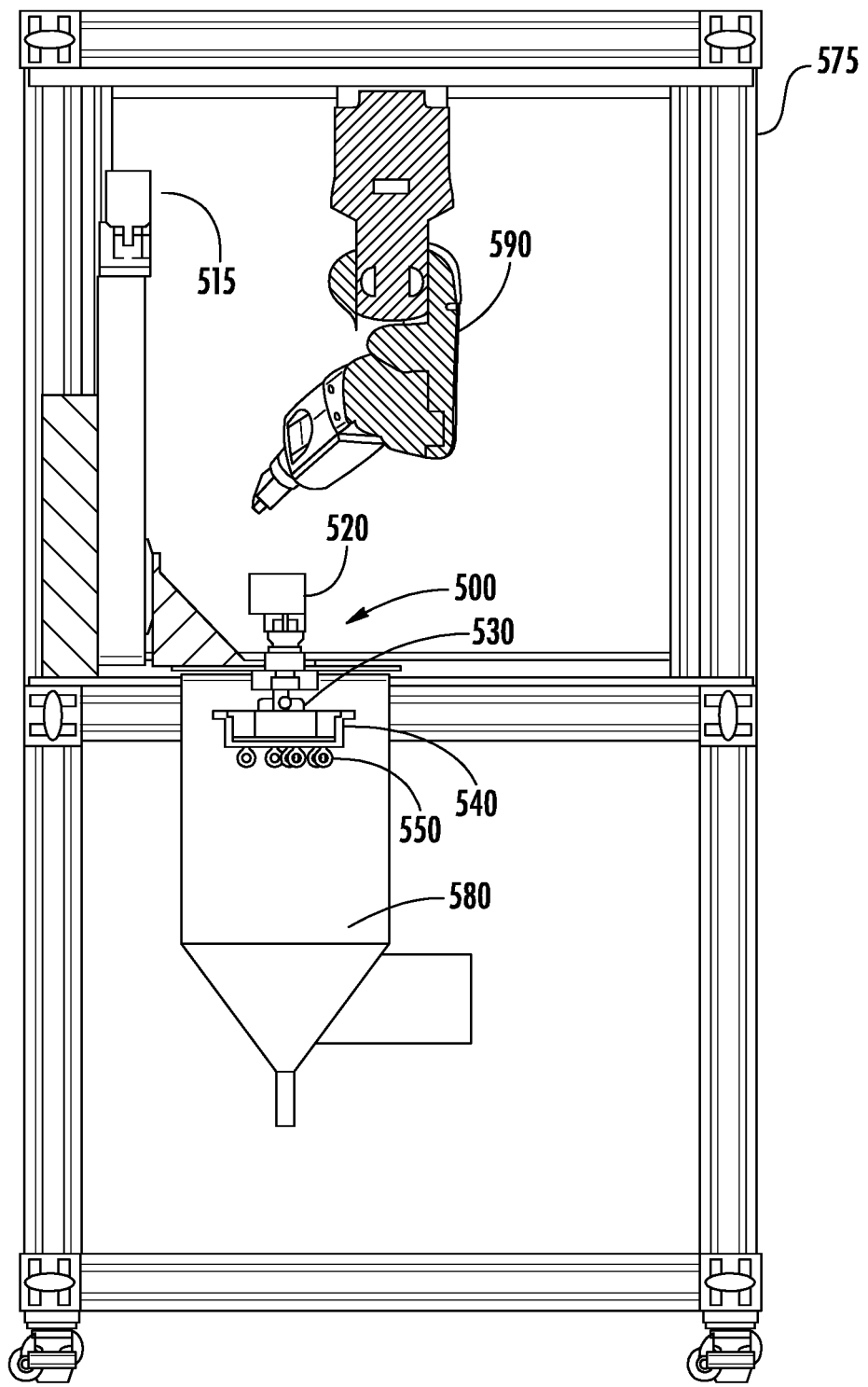

FIGS. 5A-5B illustrate a spinning device 500 having a chamber 580 to collect excess resin during the spinning of the part, in accordance with some embodiments. The spinning device 500 is the same as the spinning device 300 of FIG. 3. In FIG. 5A the spinning device 500 is mounted to a station 570 which has the chamber 580 positioned under the spinning device 500. The spinning device 500 and build tray 540 (with printed parts not visible in this view) are lowered along stand 510 by elevator motor 515 into the chamber 580. The printed parts are spun, and excess resin is collected in chamber 580 to be reclaimed. Chamber 580 may include a drain 585 to empty the reclaimed resin. Splash guard 560 serves as a cover to contain removed resin in the chamber 580. In some embodiments, the splash guard 560 may contain materials that block wavelengths that are used for curing the resin (e.g., UV) in order to prevent the collected resin from curing while in the chamber 580. For example, in some embodiments, the spinning device 500 may be stored in a lowered position in which the splash guard covers the opening of the chamber 580. In this manner, the splash guard 560 may help enable resin to be reclaimed and recycled for future use.

In FIG. 5B the spinning device 500 is mounted to an automated station 575 that includes a robot arm 590 (e.g., a 6-axis robot). FIG. 5B also shows elevator motor 515, spin motor 520, platform 530, build tray 540 and printed parts 550. In operation, the robot arm 590 is used to pick and place the build tray 540 and printed parts 550 from a PRPS and mount the build tray 540 (with printed parts 550) onto the spinning device 500 without the need for human intervention. The spinning device 500 is lowered into the chamber 580 by elevator motor 515. In the lowered position, as shown in FIG. 5B, the spin motor 520 spins the platform 530 to remove excess resin from the printed parts 550. In some embodiments, the robot arm 590 may also be used for other functions. For example, the robot arm 590 may be used to perform actions to remove excess resin from the printed parts 550 instead of or in conjunction with the spinning device 500. As examples, the robot arm 590 may be used to spin the printed parts 550 at various angles, to perform angular and/or linear acceleration/deceleration actions or perform other movements to remove excess resin.

Although the steps above for creating a smooth surface finish have been described using residual resin from a photopolymerization process that made the 3D-printed part, in other embodiments, the 3D-printed part can be wetted with a surface finish material in a separate step. Furthermore, the surface finish material can be the same or a different material than that used to produce the part. For example, the part can first be printed by a resin-based (e.g., SLA or continuous liquid interface printing CLIP™) or powder-based (e.g., SLS, Multi Jet Fusion™ or direct metal laser sintering) additive manufacturing process. Then a surface finish material that is the same or different from the material used to print the part can be applied. If a different material will be used, then the part may be cleaned after printing and prior to applying the surface finish material. In further embodiments, the part may be manufactured by any process, including 3D-printing and non-3D printing methods, and a surface finish material of the same or different material that the part is made from is applied. Examples of surface finish materials include, but are not limited to, lacquers (e.g., shellac), urethanes, photopolymers, epoxies (e.g., multi-part) and paints.

In some embodiments, a surface finish material that is different from the resin used to print the part is selected to achieve customized properties of the final part, where the properties are different or improved over the properties of a part printed with the 3D printing resin alone. For example, the enhanced properties may be increased or decreased in value over a part printed using the print resin according to the desired end product specifications. Customized properties may include mechanical properties, such as one or more of tensile modulus, ultimate tensile strain, ultimate tensile stress or flexural modulus, or associated time-dependent properties such as stress relaxation or creep. Example ranges of mechanical properties that can be achieved include tensile modulus from 100 MPa to 800 MPa, or 800 MPa to 1100 MPa, or 1100 MPa to 2000 MPa or higher; ultimate tensile strain up to 200% or ranging from 5% to 500% or higher; and ultimate tensile stress of up to 50 MPa or ranging from 15 MPa to 90 MPa or higher. Using a dental aligner as one example, stress relaxation of the final produced part can be enhanced by adding a surface finish material that increases the point at which the laminate material fractures, while also improving comfort for the user. Tensile modulus, ultimate tensile strain, and ultimate tensile stress are properties that contribute toward stress relaxation and can be tailored by the chosen combination of printing resin and coating (surface finish) material. Examples of materials for the resin and/or surface finish material include but are not limited to acrylates, epoxies, methacrylates, urethanes, silicones, vinyls, combinations thereof, or other photoreactive resins that crosslink upon exposure to illumination. Adhesives, thermal films, ultraviolet films and shrink wrap materials (e.g., applying a film or sheet of shrink wrap material onto the part and heating the film so that it conforms to the part) may also be utilized.

The parts may be cleaned with, for example, a conventional IPA cleaning prior to applying the surface finish material. In some embodiments, the surface finish material can be applied by dipping the part into the surface finish material. In other embodiments, spraying (e.g., air brushing) or painting can be used to coat the surface of a 3D printed part with the surface finish material. The painting can include, for example, bringing a brush (e.g., a bristled brush) containing the surface finish material into contact with the part while the part is stationary or while the part is rotating. In some embodiments, the part may be completely coated with the surface finish material, while in other embodiments the surface finish material may be applied to only certain sections of the part. Examples of partial coating include selectively applying (e.g., dipping, spraying, painting or other technique) the coating to only a segment or a side of the part where the surface finish material is desired to be present. Partial coating may include techniques to constrain the surface finish to only the desired areas during spinning, such as applying the surface finish on a bottom portion of the part so that it does not spread to the top during spinning, or positioning the part on the spinning device so that the surface finish moves in a specific direction (away from undesired areas), or applying a mask over certain areas to prevent the surface finish from spreading onto those areas. In some embodiments, the coating process can be repeated more than one time, using the same and/or different surface finish material for each coating to create a laminate (i.e., multi-layer) structure. Each of the applications of the surface finish material may be performed consecutively to one other or with curing between some or all of the coating layers. Each coating layer may be performed according to any of the coating embodiments disclosed herein such as coating over the entire part or a portion of the part.

In operation of the spinning device, rotation parameters are set such that a portion of the uncured surface finish material (resin or different material) remains on the surface of the part to create the desired smooth surface. For example, the centrifugal machine may be turned on for a specified duration of rotation time at a specified rotation speed. In some embodiments, rotation parameters can include speed ramp rates, speed deceleration rates, multi-step rotation (e.g., slow spin for a first duration of time followed by a faster spin for a second duration of time) and/or precession of the axis of rotation (i.e., indexing or rotating the axis of rotation in an angular manner, where the rate and/or angle of precession can be modified). Spinning durations may be, for example, from 10 seconds to 30 seconds, or 30 seconds to 180 seconds, or 180 seconds to 3600 seconds or more. Spinning speeds may be, for example, 10 RPM to 500 RPM, or 500 RPM to 6000 RPM, or more than 6000 RPM. Speed ramp-up or ramp-down rates may involve a change in rotation rate ranging from, for example, 0 to 3000 RPM in 5 seconds, 10 seconds, or 20 seconds Angles of axial rotation may be in the range of, for example 0 to 90 degrees, or 90 to 180 degrees. The rotation parameter values will depend on part geometry, resin viscosity, and other parameters to provide enough acceleration to centrifugally force a portion of the uncured resin away from the part while imparting a low enough force that enables some resin to be retained on the part due to surface tension. The remaining resin (or other surface finish material that is used) can cover some or all of the part. For example, in some embodiments the remaining surface finish material can be a thin layer of coating over the entire surface. In other embodiments, the remaining surface finish material may fill pits, pores, cracks or other defects greater than a certain size but need not cover portions of the part that already have a sufficiently smooth surface. In further embodiments, the smoothing process can be applied to only a section of a part, such as smoothing only an outward surface of a part but not an interior surface that will be joined to another component (with a lower tolerance requirement for surface finish). In such a case, the part may be partially dipped or coated with the surface finish material in the segment that requires the high-quality surface finish.

In some embodiments, the viscosity of the surface finish material may be altered during the process to achieve certain characteristics. For example, the surface finish material can be heated or cooled during the rotating to decrease or increase the viscosity compared to room temperature, thereby increasing or decreasing the distribution and/or removal of the surface finish material during spinning of the part. Utilizing temperature to control the viscosity of the surface finish material can be useful in enabling the use of a surface finish material that may have too high or too low of a viscosity at ambient temperature to achieve the desired geometrical features. In another example, controlling the temperature to control the viscosity may help ensure process repeatability between facilities at different geographic locations that have different ambient temperatures.

After spinning and establishing a desired smooth finish, the parts may be exposed to a curing process. In some embodiments, the surface finish material may harden on its own, such as through natural drying or through an inherent chemical reaction. In embodiments where a specific curing step occurs, the curing process can make the part more rigid and stable and harden the uncured layer of resin that remains on the part. For embodiments in which the surface finish material is different from the printed resin, curing may help enhance mechanical properties such as tensile modulus, strain and stress of the final part by forming bonds (e.g., crosslinked bonds) at the interface between the layers of materials and/or by providing different or enhanced properties compared to the original print resin. In contrast, in conventional methods any remaining uncured resin is washed off of the parts. Curing of the remaining surface finish material in the present embodiments also helps evaporate or eliminate moisture that can otherwise cause issues during an investment casting process. The curing process can involve various known methods, such as high-intensity discharge bulbs in an inert gas (e.g., argon, nitrogen, or other gases to displace oxygen) and/or any light source with or without an inert gas. In the present embodiments, the part may be cured within a timeframe after the spinning that prevents possible degradation of the surface finish. This timeframe may depend on the resin viscosity. For example, it may be desirable to cure thinner (low viscosity) resins more quickly after the spinning step than thicker (high viscosity) resins, as thinner resins are more likely to drip or seep if left uncured.

Figure 13A:
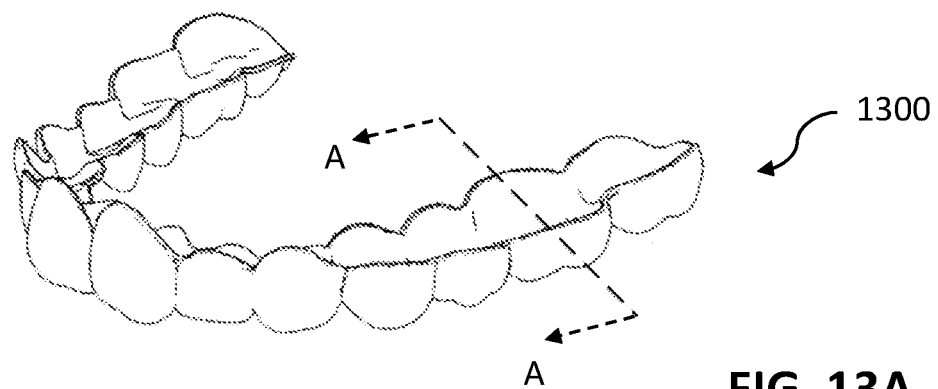
FIGS. 13A-13C are various views of an additively manufactured part with a surface finish material to customize mechanical properties, in accordance with some embodiments.
Figure 13B:
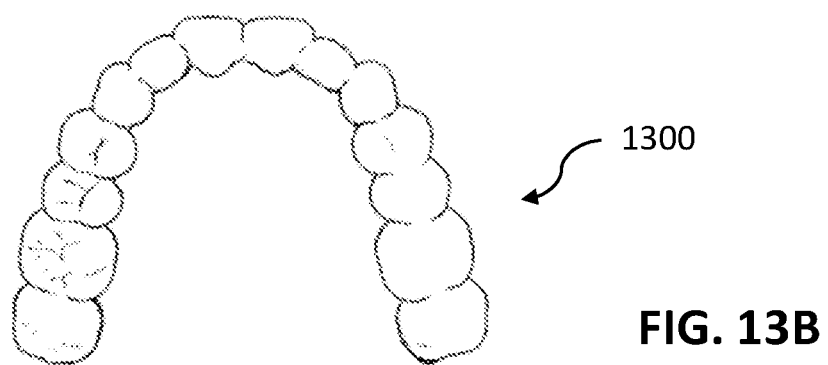
Figure 13C:
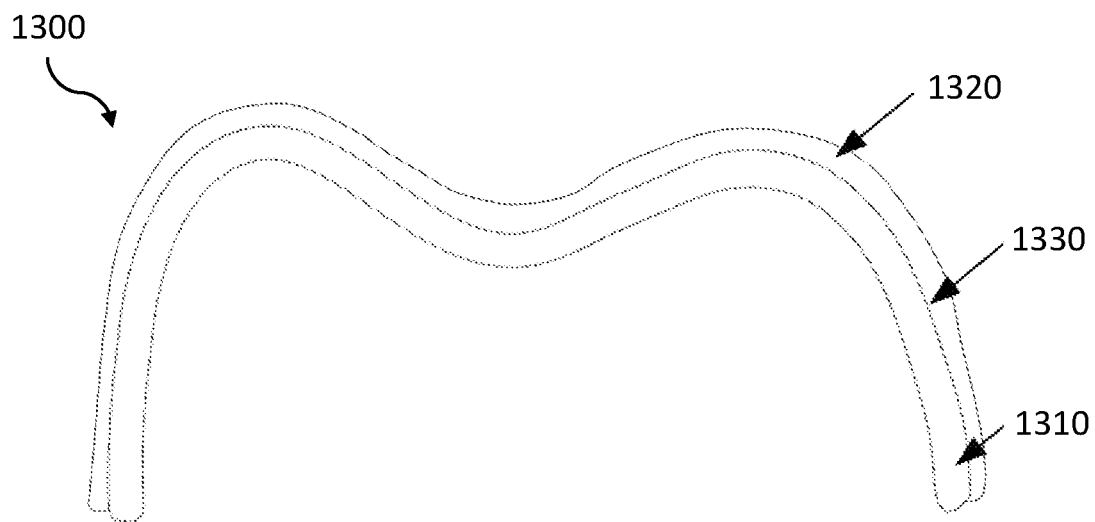

FIGS. 13A-13B are perspective and top views, respectively, of a dental aligner 1300 to demonstrate the use of surface finish materials to customize properties of a final printed part, in accordance with some embodiments. A user wears the dental aligner 1300 by placing the inner, concave surface of the aligner over their teeth. FIG. 13C is a cross-sectional view taken along section A-A of FIG. 13A, showing the resin material 1310 of the originally printed part, a surface finish material 1320 (i.e., coating) on an outer surface of the resin material 1310, and an interface 1330 between the resin material 1310 and surface finish material 1320. Although the surface finish material 1320 has been applied on the outer surface of the printed part in this embodiment, in other embodiments a surface finish material for enhancing properties of the final part may be applied on an inner surface, over an entire surface, or portions of inner and/or outer surfaces of the printed part. Material bonds are formed between the resin material 1310 and surface finish material 1320 at the interface 1330. Consequently, the composite structure of the dental aligner 1300 reaps the benefits of both materials thereby enhancing the properties of the final part. The composite properties of the final part can be customized by the choice of materials (print resin and surface finish materials), thicknesses of the layers, and locations where the surface finish material 1320 is applied. Embodiments may also include tailoring the thickness of the coating layer and/or the placement of the coating in specific locations or the entirety of the printed part.

In this embodiment of a dental aligner, the customized properties may be mechanical properties such as one or more of tensile modulus, ultimate tensile strain and ultimate tensile stress to improve the stress relaxation of the laminate structure compared to if the dental aligner was fabricated from the 3D printed resin alone. Example formulation components for the resin material 1310 (printing material) or surface finish material 1320 (coating) for the dental aligner 1300 include a combination of methacrylates, acrylates, and/or photoinitiators. In further examples, urethane acrylates/methacrylates, dendritic acrylates/methacrylates, and a variety of oligomers and specialty additives may be used for either the resin material 1310 or surface finish material 1320.

In an embodiment of a process for making dental aligners, dental aligners are formed via an additive manufacturing process. The parts are spun to remove excess print resin as described throughout this disclosure, coated with another material having a a different mechanical property than the print resin (e.g., higher flexural modulus), then spun again to remove excess coating material as described throughout this disclosure, and cured. The application of the coating material beneficially enhances the mechanical properties of the aligners, such as to achieve a desired stress relaxation performance which is important to its usage. Bonds formed at the interface between the original material (i.e., additive manufactured part material) and the coating (i.e., surface finish material applied via dipping, spraying, or other method) beneficially impart the mechanical properties of both individual components into the final coated part. Specifically, in the case for improving stress relaxation of a dental aligner the original material used in the additive manufacturing process may be selected to provide the benefit of withstanding high forces while the coating material may be selected for the benefit of flexibility, ultimately resulting in a composite material in the final dental aligner that is strong enough to move and correct teeth position over time while being flexible enough to provide comfort to the user. This customized stress relaxation performance is accomplished through the unique selection and layering of the materials chosen to be included in the composite material, specifically mechanical properties comprised of tensile modulus, ultimate tensile strain, and ultimate tensile stress.

Figures 14A, 14B:
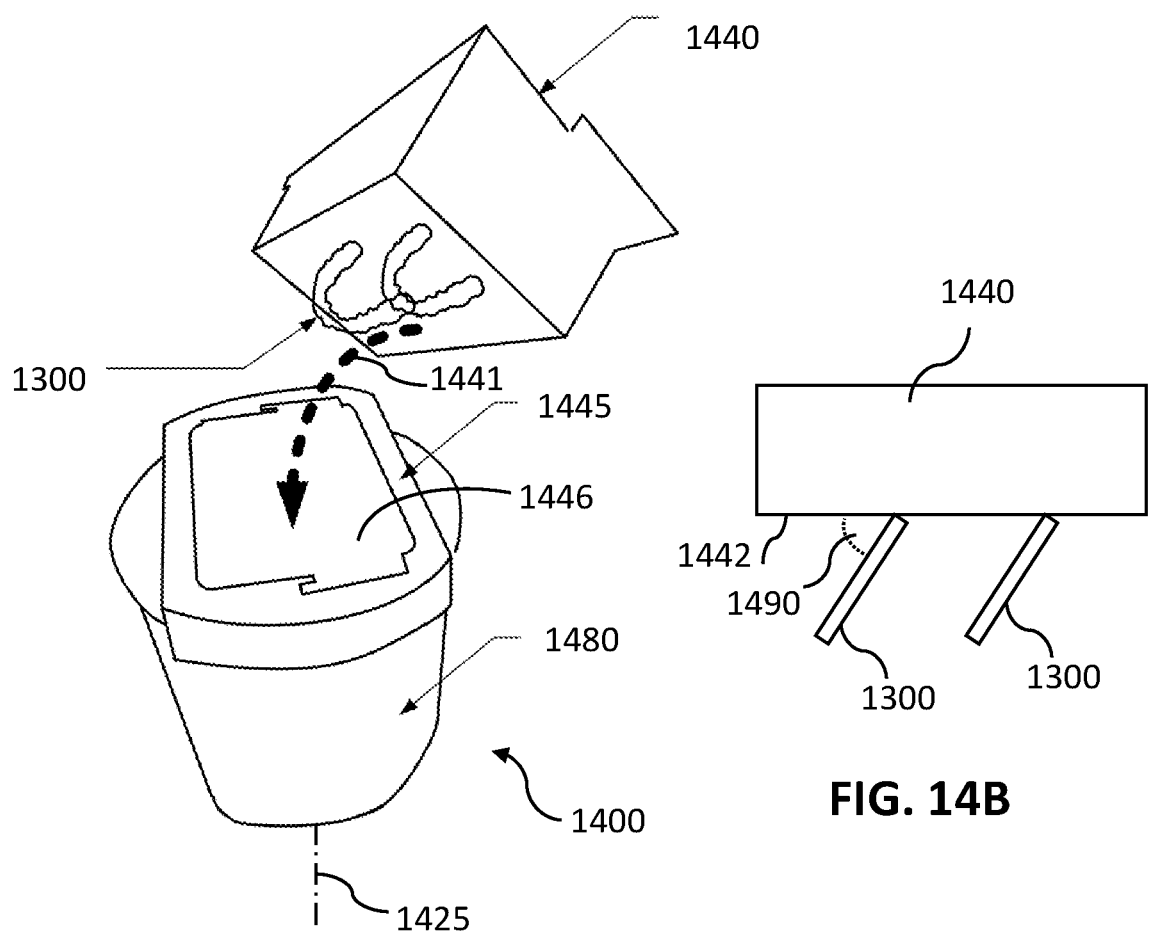
FIGS. 14A-14B illustrate a spinning device for additively manufactured parts with a surface finish material to customize mechanical properties, in accordance with some embodiments.

FIG. 14A shows two dental aligners 1300 in a spinning device 1400 that includes a spinning platform 1445 on a spinning chamber 1480. The spinning device 1400 has a central rotation axis 1425. Build platform 1440, to which the printed dental aligners 1300 are attached, are mounted into opening 1446 of the spinning platform 1445 as shown by arrow 1441 so that excess material (print resin and/or surface finish material applied to the dental aligners 1300) can be collected by the spinning chamber 1480 when the parts are rotated. FIG. 14B is a side view of the build platform 1440 showing that the dental aligners 1300 are at an angle 1490 (≤90°, e.g. 20°-75°) with respect to surface 1442 of the build platform 1440 in this embodiment. The concave surface dental aligner 1300 may be facing towards or away from the surface 1442 in various embodiments, such as depending on the spinning direction used. In other embodiments, the dental aligners 1300 may be oriented flat (0°) on the surface 1442, or perpendicular, or other angle.

Figure 15A:
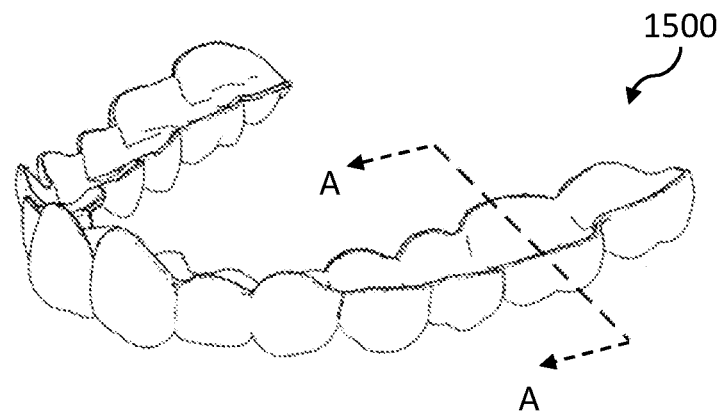
FIGS. 15A-15B show an additively manufactured part with multiple surface finish material layers to customize mechanical properties, in accordance with some embodiments.
Figure 15B:
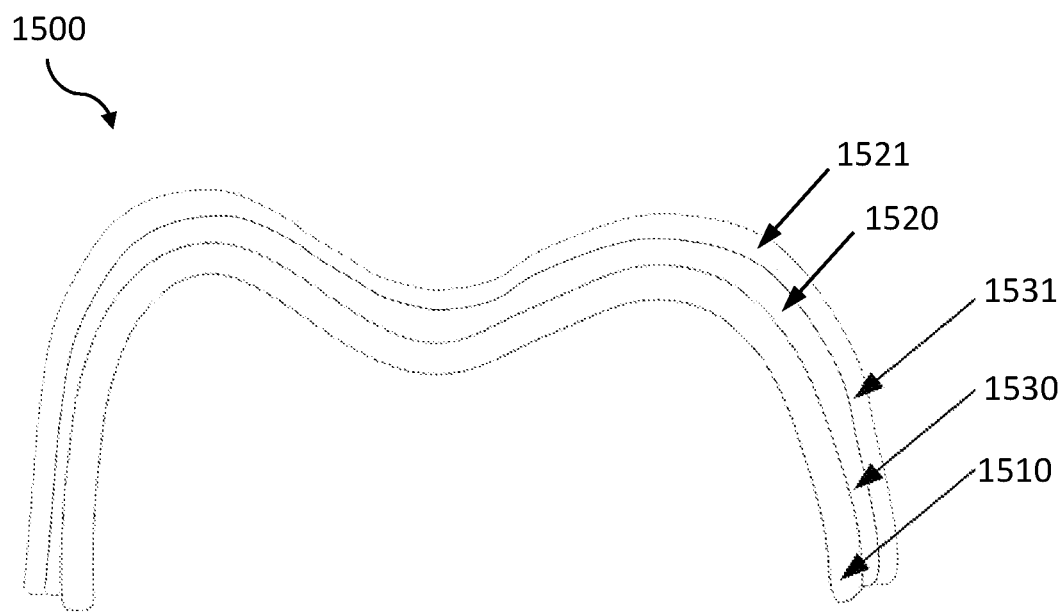

FIGS. 15A-15B are perspective and cross-sectional views (along section A-A), respectively, of a dental aligner 1500 that has two surface finish materials 1520 and 1521 on resin material 1510 which was used to print the dental aligner 1500. Bonds at interface 1530 (between resin material 1510 and surface finish material 1520) and interface 1531 (between surface finish material 1520 and surface finish material 1521) create enhanced mechanical properties for the completed dental aligner 1500, such as improved stress relaxation compared to the resin material 1510 alone. In one example of using more than one coating layer, surface finish material 1520 may be used to improve stress relaxation and the outer surface finish material 1521 may be used to provide scratch resistance.

Figure 16A:
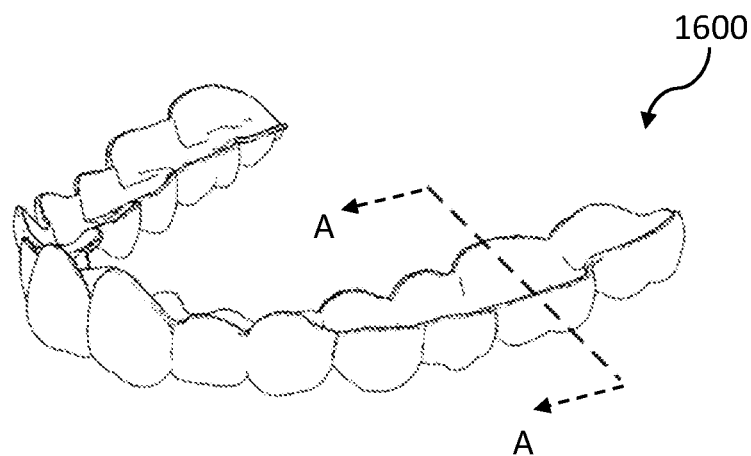
FIGS. 16A-16B show an additively manufactured part with multiple surface finish material layers to customize mechanical properties, in accordance with some embodiments.
Figure 16B:
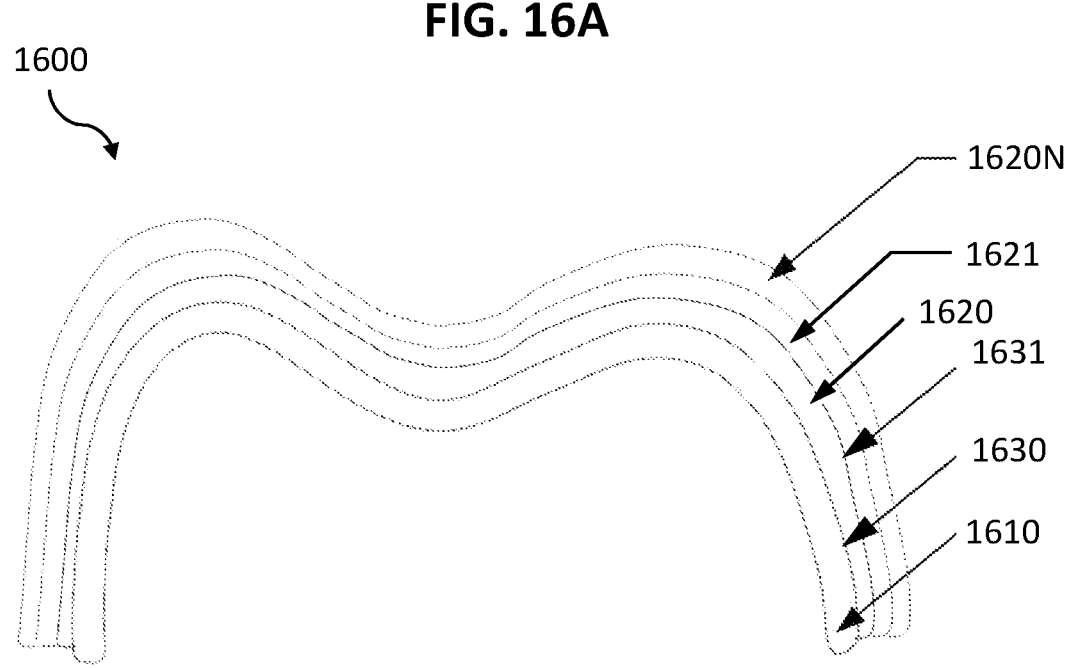

FIGS. 16A-16B are perspective and cross-sectional views (along section A-A), respectively, of a dental aligner 1600 that has multiple ("N") surface finish materials 1620, 1621 and up to N layers (layer 1620N and any other layers between 1621 and 1620N) on resin material 1610 that was used to print the dental aligner 1600. Bonds at interface 1630 (between resin material 1610 and surface finish material 1620), interface 1631 (between surface finish material 1620 and surface finish material 1621), and subsequent interfaces between layers create enhanced mechanical properties for the composite dental aligner 1600 as described above.

Figure 17:
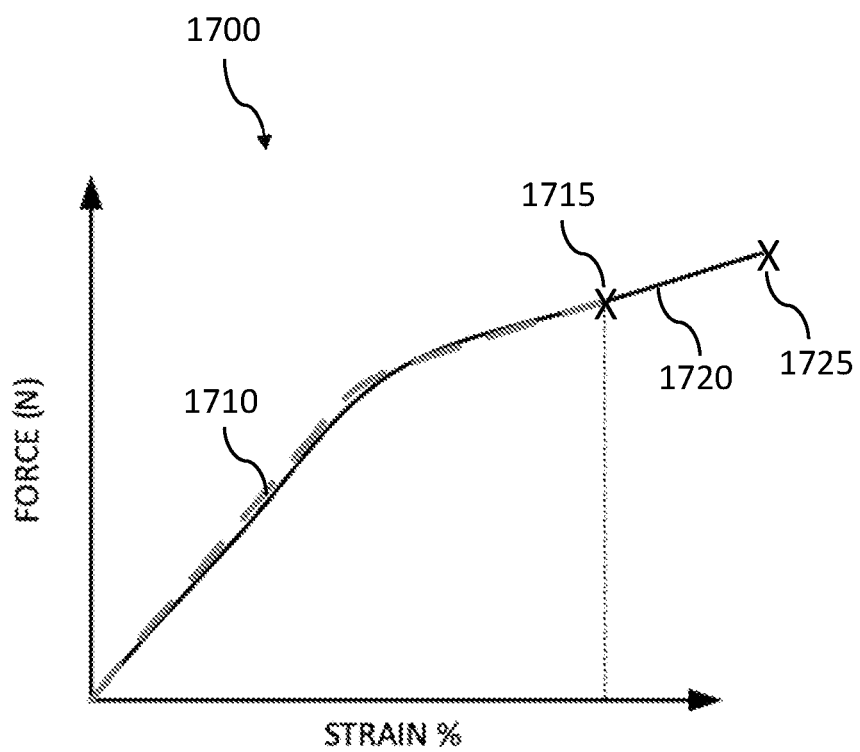
FIG. 17 is a force-strain graph for a material with and without an added surface finish material coating, in accordance with some embodiments.

FIG. 17 is a simplified graph 1700 of force (in Newtons) as a function of strain (percent) for a composite structure such as a dental aligner of FIGS. 14-16. The graph 1700 represents results from tensile testing per ASTM D638, where tensile bars of 500 µm to 6 mm thickness all resulted in curves similar to that shown in the graph 1700. Dashed curve 1710 represents a single material (i.e., non-coated), while solid curve 1720 represents a laminate structure of a first material (printed material) coated with a more flexible material than the first material. Fracture point 1715 for curve 1710 of the non-coated material compared to fracture point 1725 for curve 1720 of the laminate material illustrates that adding a flexible coating to the core material delays the point at which the laminate material fractures. This allows for an improvement in both ultimate tensile strain and ultimate tensile stress. Thus, graph 1700 demonstrates that the coated material (curve 1720) maintains its strain performance with increased force beyond the non-coated case (curve 1710). In the example use case of a dental aligner, it is desirable to maximize both tensile strain and ultimate tensile stress which can be achieved by adding this flexible coating. In some embodiments, the coating can provide better comfort by having a softer laminate material on the inside (concave) surface of the dental aligner, interfacing with the user's teeth rather than the more rigid core material. In embodiments for a dental aligner, coating thicknesses may be, for example, 50 µm to 500 µm or more, such as 100 µm or 200 µm. Although the coating material (and related manufacturing process) of graph 1700 is advantageous for direct print dental aligners, such a process can be advantageous for a multitude of other applications, such as sleep apnea night guards, electrical connectors, automotive components, handles, footwear, medical splints, dental splints, prosthetics, and other applications requiring similar stress relaxation performance.

Figure 18A:
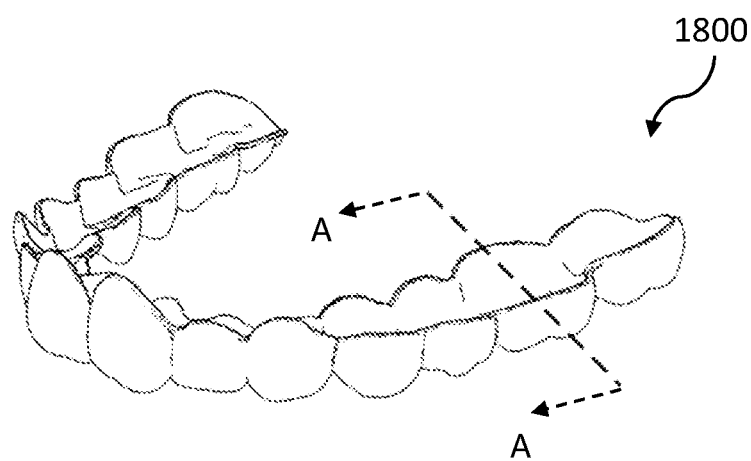
FIGS. 18A-18B show an additively manufactured part with geometrical features in the printed part and a surface finish material layer to customize mechanical properties, in accordance with some embodiments.
Figure 18B:
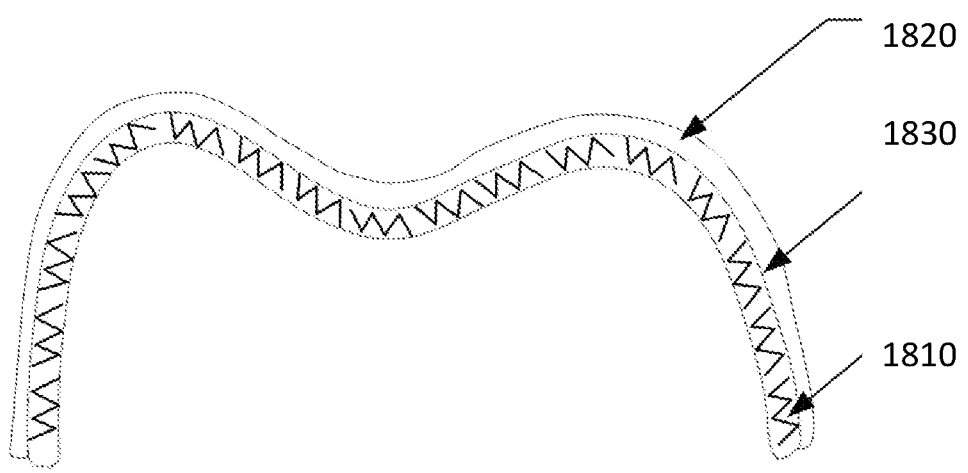

FIGS. 18A-18B illustrate further embodiments in which an additively manufactured part can be formed with high surface area to enhance the bonding of a surface finish material to the original printed part. Using a dental aligner 1800 again as an example, FIG. 18A shows a perspective view while FIG. 18B shows a cross-section along section A-A. Geometrical features in printed material 1810 increase the surface area compared to a solid material by incorporating, for example, perforations, textures, and/or lattice structures (illustrated by sawtooth lines for simplicity). In this embodiment the geometrical features are illustrated as extending into the interior of the part, although the geometrical features can be along just the interface 1830 in other embodiments (including incorporated into some or all of the interface 1830). Other patterns that create open areas and/or curved/tortuous paths (that are not designated shapes of the overall outline of the printed part) within the printed material 1810 may also be utilized. The geometrical features can be incorporated at some or all of the interface 1830 and may extend into the interior of the printed material 1810 as well. These geometrical features can enable a surface finish material 1820 (which can be the same or different material than the resin for printed material 1810) to over-mold and fill cavities, creating a composite part with an internal 3-dimensional structure surrounded by other materials of different physical properties. Furthermore, the shape/geometry of the perforated, textured, or latticed structure can be customized locally in certain areas of the part to influence overall properties of the composite part (e.g., mechanical properties of stress relaxation performance, tensile modulus, tensile strain and tensile stress).

Geometric Compensation of Part Design

In some embodiments, the instructions used for printing the additive manufactured part account for the surface finish material that will be applied to the part. That is, in some embodiments, a geometric offset correction is determined that considers thicknesses of the surface finish material that will be built up on the surface of the part, along with the effects of the surface finish material on geometric features such as corners and edges. The geometric compensation may be performed by computer modeling, computer-aided design, and/or manual calculations, and can be used to correct for changes in part dimensions caused by the presence of the added surface finish material. In order to control the final dimensions of the part having the surface finish material, the desired design of the part (i.e., initial design specifications from a customer) can be shrunk or geometrically offset to a create compensated design (i.e., starting physical geometry for printing the part) that will result in the desired final part geometry and dimensions (i.e., after the surface finish material is applied, a force is applied, and the surface finish material is dried or cured). The part design can be compensated in terms of, for example, an overall dimension, a corner geometry, or an edge geometry, where the compensation may be based on, for example, a predicted glaze thickness or distribution of the surface finish material, and a location and/or orientation of the part with respect to the spinning axis. The manufactured part is a geometrically offset, corrected part which, after applying the surface finish material, will have a smooth surface finish and final dimensions matching the original design specifications.

The geometric compensation can account for one or more surface finish material layers, where the surface finish materials can be for achieving a smooth surface finish and/or customizing material properties (e.g., mechanical, thermal, electrical) of the final part. For embodiments that include customizing material properties, force analysis modeling may be used to identify areas in the geometry that need to be modified (e.g., made thicker) to withstand more force or strain. Similarly, the force analysis modeling may specify certain areas to be thinner if additional material flexibility is desired in a localized area. The geometry for the print recipe may also be compensated for thermal considerations of the chosen materials, such as thermal expansion and/or thermal conductivity.

The instructions for a printing the additive manufacturing part may be referred to as a print recipe. The print recipe contains information for each layer in a 3D printed part to be built by the additive manufacturing system, such as a PRPS. The print recipe can contain instructions for the PRPS before, during and after a print run. For example, the print recipe can include parameters and instructions related to build geometry, illumination energy, exposure time per layer, wait time between layers, print platform position, print platform velocity, print platform acceleration, resin tub position, resin tub force, resin chemical reactivity, and resin viscosity. The parameters and/or instructions contained within the print recipe can be updated before, during and/or after the print run based on input from one or more sensors in the PRPS. In some embodiments, the print recipe can be updated before, during and/or after the printing of a given layer within the printed object.

Figure 6A:
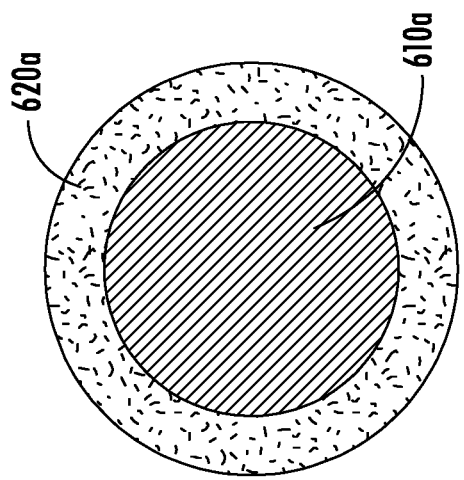
FIGS. 6A-6B are schematics of compensating the overall dimensions of a part design for a surface finish material that will be added to the part, in accordance with some embodiments.
Figure 6A:
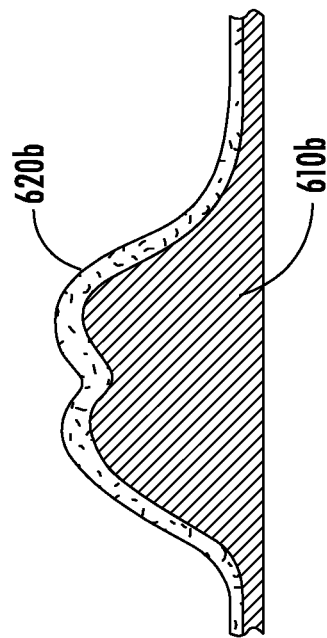
Figure 6B:
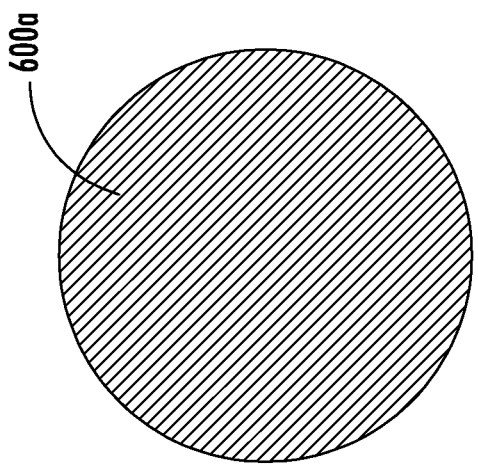
Figure 6B:
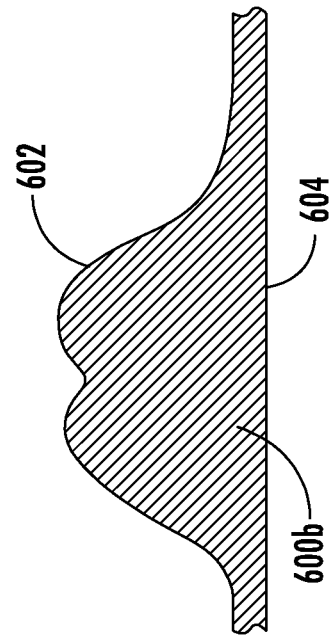

FIGS. 6A-6B are examples of embodiments in which a part design compensates for a layer of surface finish material over the entire part. In these cross-sectional views, the original parts 600a and 600b are the desired design of the final part to be delivered to the customer. In FIG. 6A the original part 600a has a circular cross-section, such as a cylinder, in which the base of the cylinder is attached to the spinning platform with the central axis of the cylinder coinciding with the axis of rotation of the spinning platform. After spinning, the surface finish material 620a will cover the lateral, circular circumference of the part approximately evenly. In FIG. 6B the original part 600b has an indented hill 602, where the base 604 of the hill 602 is centrally attached to the spinning platform on the axis of rotation and the surface finish material 620b will cover the hill 602 after spinning. According to the present embodiments, the overall dimensions are modified to be slightly smaller, as illustrated by the revised geometry 610a for original part 600a and revised geometry 610b for original part 600b, to account for the thickness of resin 620a and 620b (or other surface finish material) in FIGS. 6A and 6B, respectively that will be retained on the part to create a smooth surface finish and/or customized material properties. For example, interactions between the viscosity of the surface finish material, rotation speed, rotation time and location and orientation of the part with respect to the spinning axis can be modeled to predict the layer thickness of the surface finish material that will be retained on the part. The compensated design (i.e., revised geometry 610a/610b) can then be calculated to account for this thickness by reducing the overall dimensions of the desired design by that thickness amount. In FIG. 6A, the revised geometry 610a involves a reduced diameter of the circular cross-section, while in FIG. 6B the revised geometry 610b involves a reduced height of the hill. In some embodiments, the thickness of the surface finish material may be uniform over the entire part, while in other embodiments the thickness may vary, and the geometric design corrections can compensate for either case.

Figure 7:
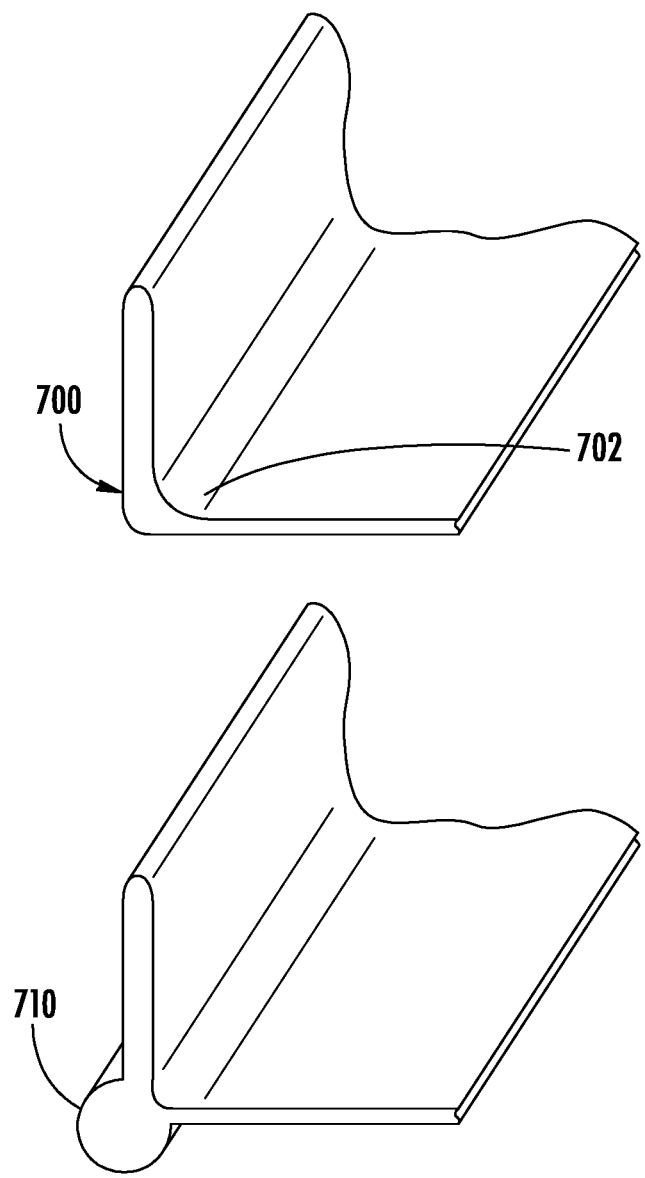
FIG. 7 is a schematic of compensating a corner geometry of a part design, in accordance with some embodiments.

FIG. 7 is a perspective view showing an example of modifying an interior corner geometry, in accordance with some embodiments. In this example, a desired (original) part design 700 having a purely right-angle interior corner will develop a fillet 702 in the corner when surface finish material is applied, due to surface tension of the uncured surface finish material (e.g., resin). This rounding of the corner may cause the part to fail to meet the required design specifications. In accordance with the present methods, a compensated design can be created to minimize the fillet build-up in the corner, such as by creating a revised geometry of a cutout feature 710 in the corner into which the added resin can wick. Although a circular cutout is shown, other geometries such as an elliptical cutout or changing the overall angle of the corner to allow for build-up of the surface finish material can be used.

FIGS. 8A-8B show examples of modifying a part design to preserve a desired exterior corner geometry (i.e., with a 90-degree angle). In FIG. 8A, a perspective view 810 and side view 820 are shown of a 3D-printed part 823 according to an original, desired design, without compensation for a surface finish material 825. The additive manufactured part 823 is a circular disk in this example. Roughness of the 3D printed part is also represented in perspective view 810 by pock marks 811 on the upper circular surface of the part, where the upper surface is smoothed by being covered with the surface finish material 825. As can be seen by the side view 820, a convex meniscus 828 of the surface finish material due to surface tension causes rounding at the circumferential edge of the part. In contrast, side view 830 shows a part 833 that is printed according to a compensated design, in accordance with the present embodiments. As can be seen, the compensated part 833 has been designed with a concave, filleted edge 838 at the circumference of the part, which will be filled in by surface finish material 825 (e.g., resin) and will result in a sharper exterior corner (e.g., closer to a 90-degree angle) as originally desired. Close-up views of original part 823 and compensated part 833 with revised geometry are also provided in FIG. 8B.

Figure 9:
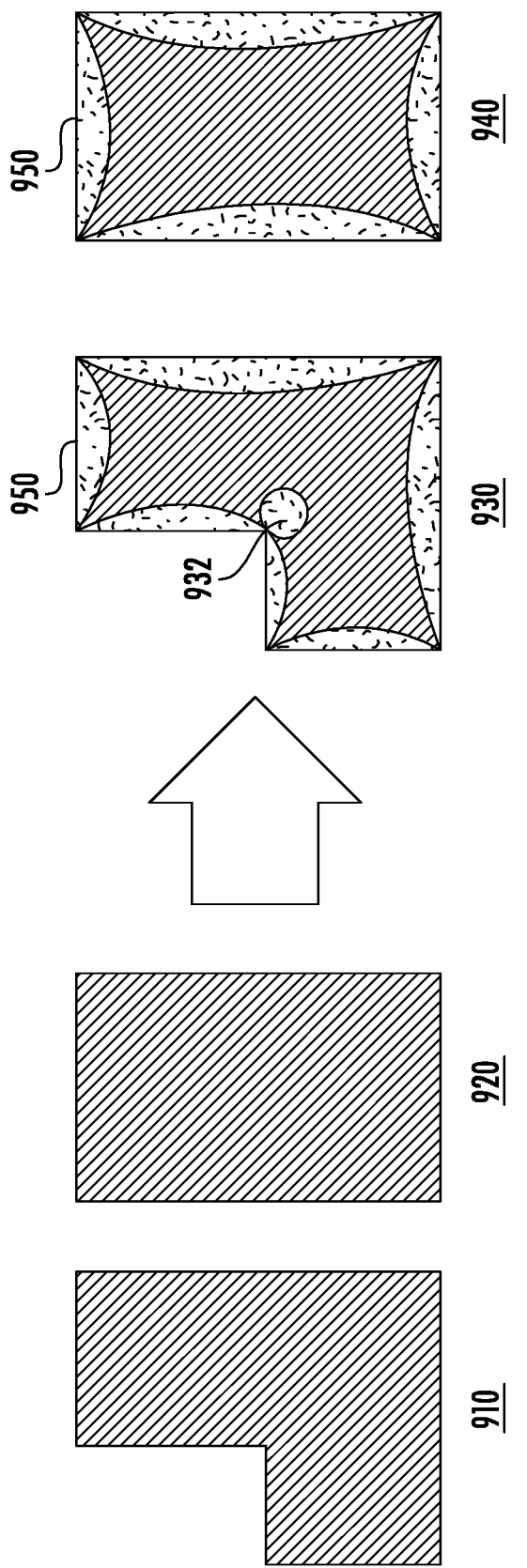
FIG. 9 is a schematic of compensating various aspects of a geometry of a part, in accordance with some embodiments.

FIG. 9 shows an example of multiple geometric corrections being applied to a part, using 2D geometry features of an L-shaped block for illustration purposes. Side view 910 and end view 920 represent the original, desired part design. Side view 930 and end view 940 represent the compensated design in which all the faces of the part have been modified from flat surfaces into concave surfaces of smaller overall dimensions than the original design. A cutout 932 of circular cross-section has also been incorporated into the interior corner of the "L." The areas 950 show where the surface finish material will be retained, resulting in dimensions and features (e.g., sharp corners and flat surfaces) that accurately match the desired design.

In some embodiments, modifying the desired design into a compensated design can include adding cavity features that are not in the original design. That is, the compensated design can utilize the build-up or wicking of surface finish material during the rotating of the part on the spinning device. For example, part 1000 in FIG. 10 has a concave surface 1002 that has been oriented to face toward the axis of rotation 1025 (i.e., center) of platform 1020. Platform 1020 rotates in a direction of rotation 1028. Part 1000 has an outward surface 1004 facing away from the axis of rotation 1025. Inward-facing, concave surface 1002 will have more build-up of surface finish material than on outward surface 1004 where excess resin can more easily escape. Thus, the inward surface may be designed with cavity features (not shown) such as a cutout or a greater reduction in dimensions than the external surface. Other embodiments of cavity features include, for example, a trench, groove, cutout or other cavity feature to capture resin at one or more locations along the concave surface 1002, to use that resin in achieving the final dimensions of the part.

Figure 10:
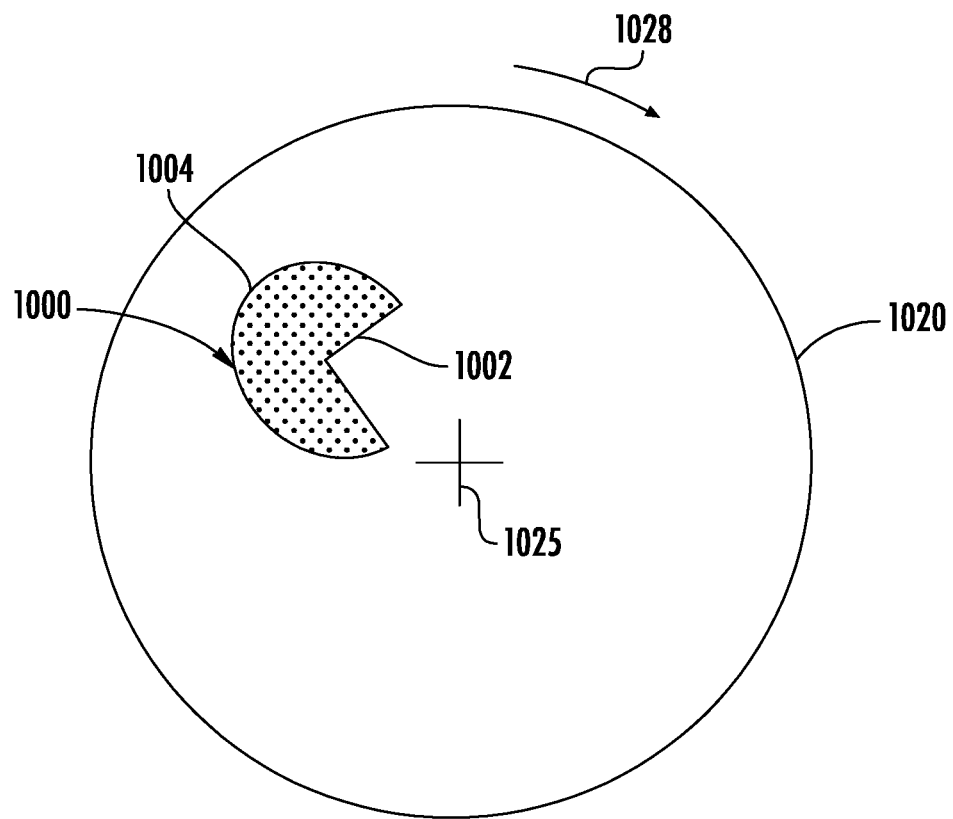
FIG. 10 is a plan view of a 3-D printed part on a platform of a spinning device, in accordance with some embodiments.

Placement of the part on the spinning device platform can be factored into the compensated design. For example, an axisymmetric part could be centered on (i.e., have its axis of symmetry aligned with) the axis of rotation of the platform. A non-axisymmetric part could be centered on-axis or placed off-axis (e.g., as shown in FIG. 10), and oriented with a particular side facing the axis of rotation according to how features of the part were modified in creating the compensated design. In some embodiments, multiple parts may be processed on the spinning device, where the parts can be identical or different from each other. The same considerations of where the parts are placed on the platform and their orientation with respect to the centrifugal forces imparted by the spinning device would apply to the multiple parts as with a single part. Additionally, load balancing of the rotating platform may be considered when spinning multiple parts at once.

These examples of FIGS. 7-10 represent creating a compensated design that serves as a print recipe for an additive manufacturing process for a part by modifying a desired design with a geometric offset correction. The geometric offset correction compensates for one or more surface finish material coating layers that are used to create a smooth surface finish and/or customizable material properties of the final additively manufactured part.

Controlling Surface Finish Removal

The present methods also include controlling the thickness and distribution of the "glazed-like" surface finish material (e.g., resin). Parameters that may be adjusted to control the final configuration include, for example, the rotation speed (e.g., angular speed in RPM), rotation time duration, placement of the part relative to the rotation axis of the spinning device, properties of the surface finish material (e.g., viscosity of the resin), surface tension between the part and the surface finish material, geometry of the part and structural integrity of the part. These considerations, as explained above, can be utilized in creating the compensated design. Example amounts of surface finish material that can be achieved on the part—whether over the entire part or in selected segments—are, for example, 0.001" to 0.100" in thickness.

In some embodiments, the removal rate of excess resin may be adjusted by controlling the temperature of the resin during the spinning (or other application of force as described below) to achieve a desired final thickness and distribution of the resin. In some embodiments, heat may be introduced to decrease the viscosity of resin, thereby providing another degree of control (in addition to speed, ramp rates, and other parameters as described herein) when removing excess resin. In some embodiments, cooling may be applied, such as to increase the viscosity. As an example of utilizing temperature to impact resin removal, heat may be used in controlling the removal of surface resin from an overall surface of the part while keeping intended fillet resins in place. In various embodiments, the heating or cooling may be applied uniformly to the entire part, such as in an oven or temperature-controlled chamber, or may be applied to a specific region of the part, such as by directing a heat nozzle at a certain portion of the part during spinning.

Alternative Methods for Spinning

Figure 11:
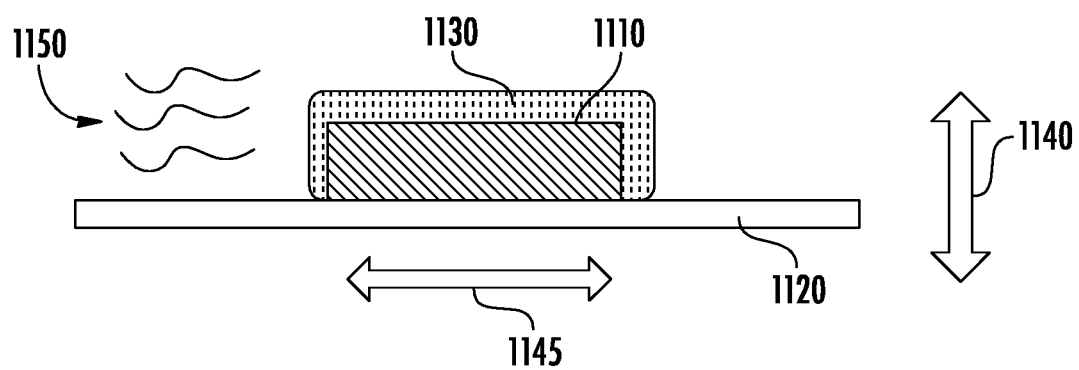
FIG. 11 is a schematic of methods of applying force to a surface finish material, in accordance with some embodiments.

In other embodiments, the spinning can be replaced by other methods of applying a force to the surface finish material. FIG. 11 shows a 3D-printed part 1110 on a build tray 1120, with uncured surface finish material 1130 on the surface of the part 1110. In some embodiments, vertical or horizontal controlled acceleration or velocity as indicated by arrows 1140 and 1145 in FIG. 11 can be used instead of centrifugal forces. In some embodiments, force may be applied by blowing forced air 1150 on the surface finish material 1130. For example, an air knife or air blade can be used to blow off excess surface finish material, where the air is controlled to remove a first portion of the surface finish material but retain a second portion of the surface finish material on the part. Other embodiments of applying the force include, but are not limited to, applying linear acceleration, applying a vibrational force, or shaking the part. The forces applied by these methods can be modeled and compensated for in the same manner as the spinning embodiments described herein.

The parameters for these processes can be adjusted to achieve the desired surface finish coating. For example, the force may be applied for a specified duration and magnitude. In some embodiments, other force application parameters can include force ramp rates, force deceleration rates, multi-step force application (e.g., a low magnitude force can be applied for a first duration of time followed by the application of a higher magnitude force for a second duration of time) and/or a change in the direction of the applied force (e.g., linear forces in multiple directions, or shaking). Forces applied to the part may be, for example, 1 g (i.e., 9.81 m/s$^2$) to 2 g, or 3 g to 20 g, or more than 20 g. The forces chosen to be applied to the part may be determined by, for example, properties of the resin (e.g., viscosity), surface tension between the part and the resin, part geometry characteristics, and structural integrity of the part.

Method Flowcharts

Figure 12:
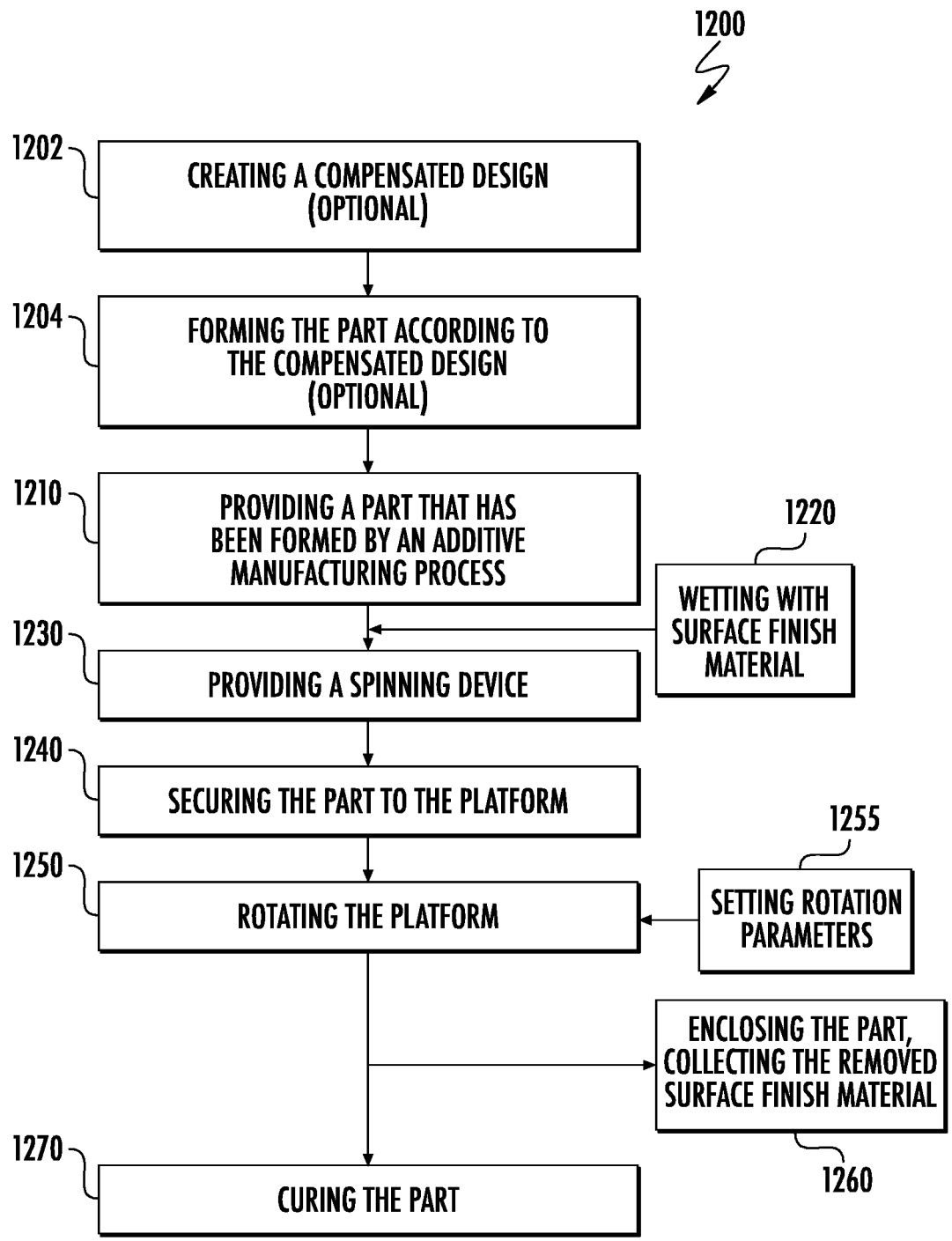
FIG. 12 is a flowchart representing methods of producing an additive manufacturing part with a smooth surface finish, in accordance with some embodiments.

FIG. 12 is a flowchart 1200 representing methods for creating a smooth surface finish on a part formed by additive manufacturing, in accordance with some embodiments. In some embodiments, the methods may begin at step 1210 with providing a part that has been formed by an additive manufacturing process. The additive manufacturing process may be performed by photopolymerization of a resin in a resin pool, such as with the system of FIGS. 1A-1B, or other additive manufacturing processes such as SLA, CLIP, SLS, Multi Jet Fusion, direct metal laser sintering, or fused deposition modeling (FDM). Some embodiments also include, prior to step 1210, a step 1202 of creating a compensated design for the part by modifying a desired design to compensate for a first portion of uncured surface finish material (e.g., resin) that will be retained on the part, and a step 1204 of forming the part with an additive manufacturing process according to the compensated design. The creating of the compensated design in step 1202 can include modifying at least one of an overall dimension, a corner geometry, or an edge geometry; or by adding cavity features into which the surface finish material will wick during rotating of the part in a later step 1250.

Step 1220 involves wetting at least a segment of the part with an uncured surface finish material. In some embodiments, such as resin-based 3D-printing techniques, the part emerges from the printing process already wetted with the surface finish material (e.g., resin). Thus, in some embodiments step 1220 is incorporated into step 1210. In other embodiments, the part may be wetted with a surface material that is different from the material used to print the part, and the surface material may be added in a separate step after forming the part. For example, the part can be 3D-printed in step 1204, cleaned, moved to a surface finishing station in step 1210, and then wetted in step 1220 with the surface finish material. The wetting can involve, but is not limited to, dipping, spraying or painting some or all of the part with the surface finish material. In one embodiment, the additive manufacturing process comprises photopolymerization of a resin in a resin pool and the part is wetted with the surface finish material after forming the part, where the surface finish material is a different material from the resin or may be the resin itself.

In step 1230 a spinning device is provided, the spinning device having a platform that rotates about an axis. The additive manufactured part is secured to the platform in step 1240, which may involve directly attaching the part to the platform. In other embodiments, the part may be kept on a build tray on which the part was formed, and the build tray is coupled to the platform in order to secure the part to the platform. During step 1240, the part is still at least partially wetted with uncured resin from the resin pool or with the surface finish material in an uncured state.

The platform is rotated in step 1250, which spins the part such that a first portion of the uncured surface finish material (e.g., resin) is retained on the part and a second portion of the uncured surface finish material is removed. The method may include setting rotation parameters in step 1255 to retain the first portion of the uncured resin during the rotating, where the parameters may optionally be set according to the compensated design. The rotation parameters include a rotation speed and rotation time, where setting the rotation parameters also may account for a viscosity of the surface finish material (e.g., resin). In some embodiments, rotation parameters are set to retain a desired amount of the first portion of the surface finish material during the rotating, such as an amount that was determined during creating a compensated design in step 1202. The surface finish material that is retained on the part provides a smooth surface finish by filling in and/or covering rough surface features. Removal of excess surface finish material during the rotating also achieves cleaning of the part, thus reducing post-processing time. The cleaning is achieved without the use of materials such as IPA (which can itself introduce pitting on the surface of the part), thus reducing hazardous materials from the processing flow.

Steps 1240 and 1250 may involve spinning one part or a plurality of parts at once with the spinning device, where the parts can be the same or different from each other. In such embodiments, step 1240 of securing the part involves arranging a plurality of parts on the platform, based on a geometry of the plurality of parts, to enable the excess uncured resin (or other surface finish material) to be removed and the desired portion of the uncured resin to be retained. Some embodiments may involve placing the part centrally on the axis of rotation of the spinning platform or offset from the axis of rotation.

In other embodiments of flowchart 1200, step 1230 can be replaced with providing a device that applies a force other than a centrifugal force, as described above in this disclosure. For example, devices may be used to apply forced air, linear acceleration, vibrational force, or shaking to the part. In such embodiments, step 1250 of rotating the platform would be replaced with applying the force to the surface finish material, where the first portion of the surface finish material is retained on the part and a second portion of the surface finish material is removed. Step 1255 would involve setting force parameters (e.g., magnitude of the force or acceleration, duration of applying the force), taking into account the viscosity of the surface finish material, to achieve the desired amount and distribution of surface finish material on the part.

Returning to the main flow of flowchart 1200, some embodiments include step 1260 of enclosing the part in a chamber, such as described in relation to in FIGS. 5A-5B, and collecting the second portion of the uncured surface finish material (e.g., resin) that is removed during the rotating. This collection of material enables recycling of excess resin, for example, that can be reused in a photopolymerization process or collecting excess surface finish material that can be used to create smooth surface finishes on other parts.

In step 1270 the final part is completed by curing the part such that the uncured surface finish material that has been retained on the part is hardened. In embodiments where the part was printed according to a compensated design, the final part with surface finish material on it has dimensions that match the original, desired design.

In some embodiments, the desired surface finish and customized material properties (e.g., mechanical properties) can be achieved in a multi-stage process. In such embodiments, step 1220 of wetting the part with a surface finish material through step 1270 of curing the part could be iterated more than once. For example, after steps 1220-1270 are performed an initial time, the surface finish material can be applied a second time (e.g., by dipping the part in, or spraying the part with the surface finish material), rotated and cured, then the surface finish material can be applied a third time and rotated and cured, where the same or different surface finish material can be used each time. The part could be quantitatively and/or qualitatively assessed after each cure to check whether the desired thickness and/or smoothness of the surface finish material and/or mechanical properties has been achieved. The surface finish material(s) can be used to achieve a smooth surface and/or to enhance material properties of the produced part.

Figure 19:
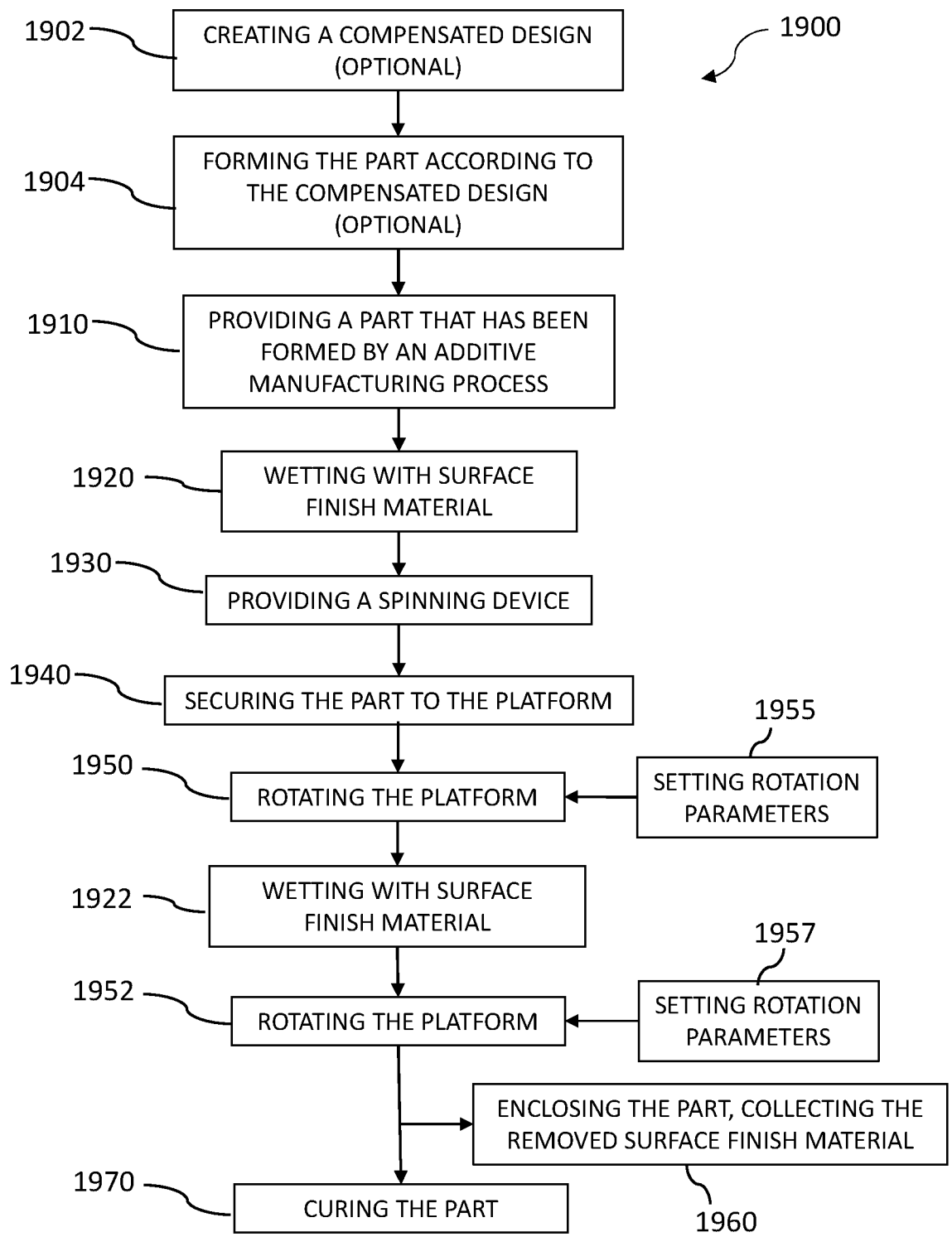
FIG. 19 is a flowchart representing methods of producing an additive manufacturing part with a smooth surface finish and customized properties, in accordance with some embodiments.

FIG. 19 is a flowchart 1900 representing methods for creating a smooth surface finish on a part formed by additive manufacturing as well as customizing material properties of the final part, in accordance with some embodiments. Steps of flowchart 1200 that correspond to those of flowchart 1900 (e.g., providing a part, wetting, securing, rotating, setting rotation parameters, curing) shall apply to flowchart 1900, and therefore will not be described in full detail.

In some embodiments, methods may begin at step 1910 with providing a part that has been formed by an additive manufacturing process. The additive manufacturing process may be performed by photopolymerization of a resin in a resin pool, such as with the system of FIGS. 1A-1B, or other additive manufacturing processes such as SLA, CLIP, SLS, Multi Jet Fusion, direct metal laser sintering, or fused deposition modeling (FDM). Some embodiments also include, prior to step 1910, a step 1902 of creating a compensated design for the part by modifying a desired design to compensate for a first portion of uncured surface finish material (e.g., resin) that will be retained on the part, and a step 1904 of forming the part with an additive manufacturing process according to the compensated design.

Step 1920 involves wetting at least a segment of the part with an uncured surface finish material. In some embodiments, such as resin-based 3D-printing techniques, the part emerges from the printing process already wetted with the surface finish material (e.g., resin). Thus, in some embodiments step 1920 is incorporated into step 1910. In other embodiments, the part may be wetted with a surface finish material that is different from the material used to print the part, and the surface finish material may be added in a separate step after forming the part. In one embodiment, the additive manufacturing process comprises photopolymerization of a resin in a resin pool and the part is wetted with the surface finish material after forming the part, where the surface finish material is a different material from the resin or may be the resin itself. The surface finish material may be utilized to create smooth surface finish for the part and/or to customize material properties (e.g., mechanical, thermal, electrical) of the final part.

In step 1930 a spinning device is provided, the spinning device having a platform that rotates about an axis. The additive manufactured part is secured to the platform in step 1940, which may involve directly attaching the part to the platform. In other embodiments, the part may be kept on a build tray on which the part was formed, and the build tray is coupled to the spinning platform in order to secure the part to the platform. During step 1940, the part is still at least partially wetted with uncured resin from the resin pool or with the surface finish material in an uncured state.

The platform is rotated in step 1950, which spins the part such that a first portion of the uncured surface finish material (e.g., resin or different material) is retained on the part and a second portion of the uncured surface finish material is removed. The method may include setting rotation parameters in step 1955 to retain the first portion of the uncured resin during the rotating, where the parameters may optionally be set according to the compensated design. The compensated design may account for surface finish materials for smoothing effects and/or for tailoring properties of the final produced part.

In other embodiments of flowchart 1900, step 1930 can be replaced with providing a device that applies a force other than a centrifugal force, as described above in this disclosure. For example, devices may be used to apply forced air, linear acceleration, vibrational force, or shaking to the part. In such embodiments, step 1950 of rotating the platform would be replaced with applying the force to the surface finish material, where the first portion of the surface finish material is retained on the part and a second portion of the surface finish material is removed.

After rotating the platform in step 1950 to remove the surface finish material of step 1920, another uncured surface finish material can be applied in step 1922. This second surface finish material may be used, for example, to customize a property of the completed part, such as a mechanical, thermal, or electrical property. Wetting the part with this uncured second surface finish material may be performed using any technique described throughout this disclosure, such as explained in relation to step 1220 of FIG. 12. The uncured second surface finish material may be applied to some or all of the printed part. Another rotating is performed in step 1952, this time to remove a second portion of the uncured second surface finish material while retaining a first portion of the uncured second surface finish material on the part. Rotation parameters may be set in step 1957 for the rotating of step 1952, where the parameters of step 1957 may be the same or different from those in step 1955. The rotation parameters of step 1957 are desired according to the material characteristics (e.g., viscosity) and desired end properties and/or geometry (e.g., layer thickness) of the second surface finish material. In some embodiments, the rotating of step 1952 may be in the same or different rotational direction as the rotating of step 1950. For example, the rotating of step 1952 may be in one direction (e.g., clockwise) and the rotating of step 1950 may be in the opposite direction (e.g., counterclockwise). In another example, the part may be repositioned prior to step 1952 to have a different orientation of the part relative to the axis of the spinning device (e.g., as described in FIG. 10) compared to in step 1950. In some embodiments, both the direction and orientation of the part may be changed in the rotating of step 1952 compared to step 1950.

Some embodiments include step 1960 of enclosing the part in a chamber, such as described in relation to in FIGS. 5A-5B, and collecting the second portion of the uncured surface finish material that is removed during the rotating. This collection of material enables recycling of excess resin that can be reused in a photopolymerization process or collecting excess surface finish material that can be used on other parts. Step 1960 may occur as part of step 1952 (e.g., enclosing the part before rotating, and collecting the removed surface finish material during the rotating) as well as part of step 1950.

In step 1970 the final part is completed by curing the part such that the uncured surface finish materials that have been retained on the part are hardened. In embodiments where the part was printed according to a compensated design, the final part with surface finish material may have dimensions that match (or are similar to) the original, desired design. The final part has material properties (e.g., mechanical properties) that are influenced by the material properties of both the original printed resin as well as the surface finish materials of steps 1920 and 1922. These surface finish materials may provide a smooth surface finish as well as enhance material properties of the printed part due to the bonding of the surface finish material layers to the original printed part during the curing of step 1970.

Figure 20:
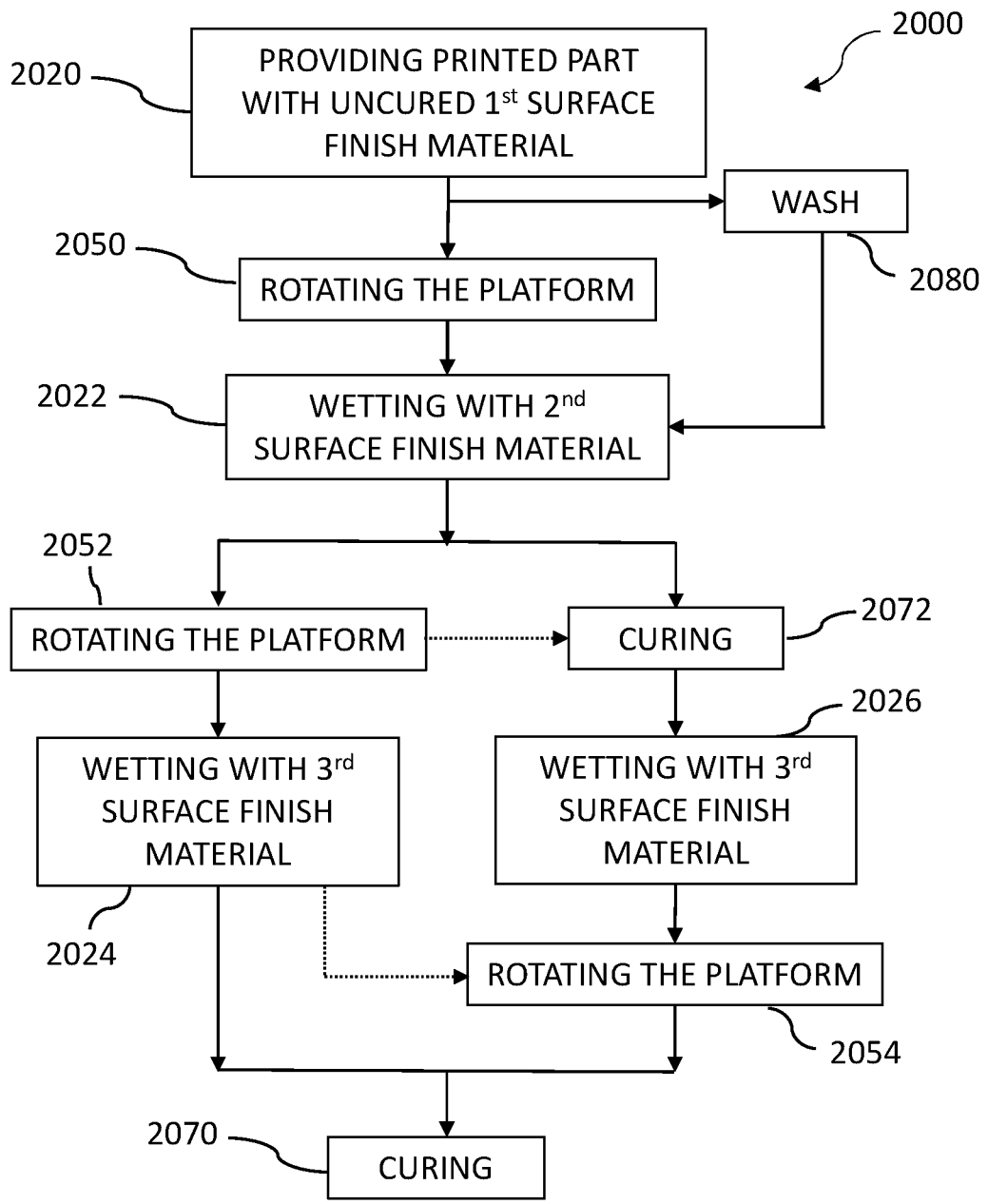
FIG. 20 is another flowchart representing methods of producing an additive manufacturing part with a smooth surface finish and customized properties, in accordance with some embodiments.

FIG. 20 is a flowchart 2000 representing further methods for creating a smooth surface finish on a part formed by additive manufacturing as well as customizing properties of the final part, in accordance with some embodiments. Flowchart 2000 represents various embodiments of applying layers of surface finish material, rotating with a spinning device, and curing layers, where the order of the steps may be used in combinations other than the sequences shown. Flowchart 2000 begins with step 2020 of providing a printed part with an uncured first surface finish material. Step 2020 may include some or all of the steps 1902, 1904, 1910 and 1920 of flowchart 1900, which are omitted from FIG. 20 for simplicity. The first surface finish material in step 2020 may be the resin that was used to print the additive manufactured part or may be a material that is different from the print resin.

Steps 2050, 2052 and 2054 of rotating the platform of a spinning device to remove a portion of surface finish material from the part may be performed as described for step 1250 of FIG. 12 and steps 1950 and 1952 of FIG. 19. The rotational direction and/or positioning of the part on the spinning platform in steps 2050, 2052 and 2054 may be the same or different from each other as described for FIG. 19. Steps 2022, 2024 and 2026 of wetting the part with a surface finish material may be performed as described for step 1220 of FIG. 12 and steps 1920 and 1922 of FIG. 19. The surface finish materials of steps 2022, 2024 and 2026 may be the same or different from each other and may be selected in order to achieve a particular smooth surface finish and/or to customize properties of the final part, such as mechanical properties. The curing of steps 2070 and 2072 may be performed as described in relation to step 1270 of FIG. 12 and step 1970 of FIG. 19.

In one embodiment of FIG. 20, a part is provided in step 2020 with an uncured first surface finish material, the part is rotated on the platform of a spinning device in 2050 to remove a portion of the uncured first surface finish material, the part is wetted with another (second) uncured surface finish material in step 2022, the part is rotated in step 2052 to remove a portion of the uncured second uncured surface finish material, the part is wetted with yet another (third) uncured surface finish material in step 2024, and the part including the printed resin and three surface finish material layers is cured in step 2070. Prior to curing in step 2070, the part may undergo another rotating on the spinning device in step 2054 to remove a portion of the third uncured surface finish material. One or more of the three surface finish materials may be selected to customize one or more properties of the final cured part, such as mechanical properties as described throughout this disclosure.

In another embodiment of FIG. 20, a part is provided in step 2020 with an uncured first surface finish material, the part is rotated on the platform of a spinning device in 2050 to remove a portion of the uncured first surface finish material, the part is wetted with another (second) uncured surface finish material in step 2022, and the part undergoes curing in step 2072 to cure the printed part and first and second surface finish materials. In an example of such an embodiment, the second surface finish material may be applied as a layer of controlled and/or uniform thickness by the coating process, thereby not requiring rotating to remove excess second surface finish material prior to curing in step 2072. In another example of curing a surface finish material coating layer without spinning the coating layer, the coating may be used to fill in desired areas such as creating fillets according to a compensated geometry design. The part is then wetted with an uncured third surface finish material in step 2026, the part is rotated on a spinning device in step 2054 to remove a portion of the third surface finish material, and the third surface finish material coating is cured in step 2070. One or more of the three surface finish materials may be selected to customize one or more properties of the final cured part, such as mechanical properties as described throughout this disclosure.

In a further embodiment of FIG. 20, a part is provided in step 2020 with an uncured first surface finish material, and the part is washed in step 2080 to remove any excess first surface finish material. In other words, in some embodiments the print resin is only used to create the primary part and not for creating a smooth surface finish or customized properties of the final part. In another example, the washing step may be introduced as a "thinning repair" measure such as when the surface material coating layers yield the desired surface finishes and properties but do not meet the overall thickness specification of the part. (i.e., if the part was not geometrically compensated from the start). After step 2080, the part is wetted with an uncured second surface finish material in step 2022. The flow may then proceed with steps 2052, 2024 and step 2070 in one embodiment, or steps 2072, 2026, 2054 and 2070 in another embodiment.

In any of the embodiments of FIG. 20, variations of the flow may occur such as performing rotating step 2052, then curing step 2072, wetting step 2026, optionally rotating in step 2054, and then curing in step 2070. Other embodiments may include adding even more surface finish material coating layers, such as described in the "N" coating layers of FIG. 16B. Any embodiments of FIG. 20 may include creating a compensated design that serves as a print recipe for the part, by modifying the original design with a geometric offset correction to compensate for one or more of the surface finish material layers.

In embodiments of the present disclosure, methods of producing an additive manufactured part with a smooth surface finish include creating a compensated design that serves as a print recipe for an additive manufacturing process for a part. The creating comprises modifying a desired design with a geometric offset correction to compensate for a first portion of an uncured first surface finish material to be retained on the part and for a first portion of an uncured second surface finish material to be retained on the part. The part is formed with the additive manufacturing process according to the compensated design, where the uncured first surface finish material is a resin used to form the part. An uncured second surface finish material is applied to the part, where the uncured second surface finish material is a material that is different from the resin. A spinning device is provided, the spinning device having a platform that rotates about an axis. The part is secured to the platform, where the part is at least partially wetted with the uncured second surface finish material. The platform is rotated, where the first portion of the uncured second surface finish material is retained on the part and a second portion of the uncured second surface finish material is removed due to forces imparted by the rotating. The part is cured after the rotating.

In some embodiments, prior to the applying of the uncured second surface finish material to the part, the methods include performing a rotating of the platform of the spinning device to remove the second portion of the uncured first surface finish material due to forces imparted by the rotating. The rotating to remove the second portion of the uncured first surface finish material may be performed in a different rotational direction or a different orientation of the part relative to the axis of the spinning device compared to the rotating to remove the second portion of the uncured second surface finish material.

In some embodiments, the applying comprises dipping, spraying or brushing. In some embodiments, methods include selecting the second surface finish material to customize a mechanical property of the part, such as a tensile modulus, an ultimate tensile strain, an ultimate tensile stress or a flexural modulus. In some embodiments, the part comprises a perforated, textured, or lattice structure. In some embodiments, the part is a dental aligner.

In some embodiments, the geometric offset correction comprises modifying a geometry of the part to customize a mechanical property of the part. In some embodiments, the geometric offset correction comprises modifying at least one of an overall dimension, a corner geometry, or an edge geometry. In some embodiments, the methods include setting rotation parameters to retain a desired amount of the first portion of the uncured second surface finish material during the rotating, where the rotation parameters comprise a rotation speed and a rotation time, and setting the rotation parameters accounts for a viscosity of the uncured second surface finish material.

In some embodiments, methods of producing an additive manufactured part with a smooth surface finish include creating a compensated design that serves as a print recipe for an additive manufacturing process for a part. The creating includes modifying a desired design with a geometric offset correction to compensate for a first portion of an uncured surface finish material to be retained on the part. The part is formed from a resin with the additive manufacturing process according to the compensated design. A spinning device is provided, the spinning device having a platform that rotates about an axis. The part is secured to the platform, where the part is at least partially wetted with the uncured surface finish material. The platform is rotated, where the first portion of the uncured surface finish material is retained on the part and a second portion of the uncured surface finish material is removed due to forces imparted by the rotating. The part is cured after the rotating. The uncured surface finish material is chosen to customize a mechanical property of the part formed by the resin after the curing.

In some embodiments, the uncured surface finish material is different from the resin. In some embodiments, the mechanical property is one of tensile modulus, ultimate tensile strain, ultimate tensile stress or flexural modulus. In some embodiments, the part comprises a perforated, textured, or lattice structure. In some embodiments, the part is a dental aligner.

In some embodiments, prior to the rotating of the part to remove the uncured surface finish material, the methods include securing the part to the platform, where the part is at least partially wetted with the resin in an uncured state after the forming; and rotating the platform, where a first portion of the resin in the uncured state is retained on the part and a second portion of the resin in the uncured state is removed due to forces imparted by the rotating.

In some embodiments, after the rotating of the part to remove the uncured surface finish material, the methods include applying an uncured second surface finish material to the part; and rotating the platform, where a first portion of the uncured second surface finish material is retained on the part and a second portion of the uncured second surface finish material is removed due to forces imparted by the rotating; where the uncured second surface finish material is chosen to customize the mechanical property of the part formed by the resin after the curing. In some embodiments, the rotating to remove the second portion of the uncured second surface finish material is performed in a different rotational direction or a different orientation of the part relative to the axis of the spinning device compared to the rotating to remove the second portion of the uncured surface finish material.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method of producing an additive manufactured part with a smooth surface finish, the method comprising:
   creating a compensated design that serves as a print recipe for an additive manufacturing process for a part, wherein the creating comprises modifying a desired design with a geometric offset correction to compensate for a first portion of an uncured first surface finish material to be retained on the part and for a first portion of an uncured second surface finish material to be retained on the part;
   forming the part with the additive manufacturing process according to the compensated design, wherein the uncured first surface finish material is a resin used to form the part;
   applying the uncured second surface finish material to the part, wherein the uncured second surface finish material is a material that is different from the resin;
   providing a spinning device, the spinning device having a platform that rotates about an axis;
   securing the part to the platform, wherein the part is at least partially wetted with the uncured second surface finish material;
   rotating the platform, wherein the first portion of the uncured second surface finish material is retained on the part and a second portion of the uncured second surface finish material is removed due to forces imparted by the rotating; and
   curing the part after the rotating.

2. The method of claim 1 further comprising:
   prior to the applying of the uncured second surface finish material to the part, performing a rotating of the platform of the spinning device to remove a second portion of the uncured first surface finish material due to forces imparted by the rotating.

3. The method of claim 2 wherein the rotating to remove the second portion of the uncured first surface finish material is performed in a different rotational direction or a different orientation of the part relative to the axis of the spinning device compared to the rotating to remove the second portion of the uncured second surface finish material.

4. The method of claim 1 wherein the applying comprises dipping, spraying or brushing.

5. The method of claim 1 further comprising selecting the second surface finish material to customize a mechanical property of the part.

6. The method of claim 5 wherein the mechanical property is a tensile modulus, an ultimate tensile strain, an ultimate tensile stress or a flexural modulus.

7. The method of claim 1 wherein the part comprises a perforated, textured, or lattice structure.

8. The method of claim 1 wherein the part is a dental aligner.

9. The method of claim 1 wherein the geometric offset correction comprises modifying a geometry of the part to customize a mechanical property of the part.

10. The method of claim 1 wherein the geometric offset correction comprises modifying at least one of: an overall dimension, a corner geometry, or an edge geometry.

11. The method of claim 1 further comprising setting rotation parameters to retain a desired amount of the first portion of the uncured second surface finish material during the rotating, wherein:
    the rotation parameters comprise a rotation speed and a rotation time; and
    setting the rotation parameters accounts for a viscosity of the uncured second surface finish material.

12. A method of producing an additive manufactured part with a smooth surface finish, the method comprising:
    creating a compensated design that serves as a print recipe for an additive manufacturing process for a part, wherein the creating comprises modifying a desired design with a geometric offset correction to compensate for a first portion of an uncured surface finish material to be retained on the part;
    forming the part from a resin with the additive manufacturing process according to the compensated design;
    providing a spinning device, the spinning device having a platform that rotates about an axis;
    securing the part to the platform, wherein the part is at least partially wetted with the uncured surface finish material;
    rotating the platform, wherein the first portion of the uncured surface finish material is retained on the part and a second portion of the uncured surface finish material is removed due to forces imparted by the rotating; and
    curing the part after the rotating;
    wherein the uncured surface finish material is chosen to customize a mechanical property of the part formed by the resin after the curing.

13. The method of claim 12 wherein the uncured surface finish material is different from the resin.

14. The method of claim 12 further comprising, prior to the rotating of the part to remove the uncured surface finish material:
    securing the part to the platform, wherein the part is at least partially wetted with the resin in an uncured state after the forming; and rotating the platform, wherein a first portion of the resin in the uncured state is retained on the part and a second portion of the resin in the uncured state is removed due to forces imparted by the rotating.

15. The method of claim 12 further comprising, after the rotating of the part to remove the uncured surface finish material:
applying an uncured second surface finish material to the part; and
rotating the platform, wherein a first portion of the uncured second surface finish material is retained on the part and a second portion of the uncured second surface finish material is removed due to forces imparted by the rotating;
wherein the uncured second surface finish material is chosen to customize the mechanical property of the part formed by the resin after the curing.

16. The method of claim 15 wherein the rotating to remove the second portion of the uncured second surface finish material is performed in a different rotational direction or a different orientation of the part relative to the axis of the spinning device compared to the rotating to remove the second portion of the uncured surface finish material.

17. The method of claim 12 wherein the mechanical property is one of tensile modulus, ultimate tensile strain, ultimate tensile stress or flexural modulus.

18. The method of claim 12 wherein the part comprises a perforated, textured, or lattice structure.

19. The method of claim 12 wherein the part is a dental aligner.

* * * * *